(12) United States Patent
Tsutsui et al.

(10) Patent No.: US 8,647,234 B2
(45) Date of Patent: Feb. 11, 2014

(54) VEHICLE DRIVING APPARATUS

(75) Inventors: Hiroshi Tsutsui, Nishio (JP); Shingo Uozumi, Nishio (JP); Takeshi Torii, Anjo (JP); Shin-ichirou Murakami, Okazaki (JP); Takahiro Miyazawa, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 557 days.

(21) Appl. No.: 13/019,628

(22) Filed: Feb. 2, 2011

(65) Prior Publication Data
US 2011/0212809 A1 Sep. 1, 2011

(30) Foreign Application Priority Data
Feb. 26, 2010 (JP) ................................. 2010-042891

(51) Int. Cl.
*B60W 10/02* (2006.01)

(52) U.S. Cl.
USPC ................................ 477/70; 477/5

(58) Field of Classification Search
None
See application file for complete search history.

(56) References Cited

U.S. PATENT DOCUMENTS

| 6,258,001 | B1 | 7/2001 | Wakuta et al. |
| 2004/0176213 | A1* | 9/2004 | Benz et al. .................... 477/166 |
| 2007/0060438 | A1 | 3/2007 | Fukuyama et al. |
| 2007/0256871 | A1 | 11/2007 | Kaneko et al. |

FOREIGN PATENT DOCUMENTS

| JP | A-2000-272362 | 10/2000 |
| JP | A-2006-105288 | 4/2006 |
| JP | B2-4039416 | 11/2007 |
| WO | WO 2005/026579 A1 | 3/2005 |

OTHER PUBLICATIONS

International Search Report issued in International Application No. PCT/JP2011/050455 on Mar. 15, 2011 (with translation).

* cited by examiner

*Primary Examiner* — Erin D Bishop
(74) *Attorney, Agent, or Firm* — Oliff PLC

(57) ABSTRACT

A vehicle driving apparatus configured with a drive power source, a fluid coupling, a transmission apparatus; and a control apparatus. A rotation of a drive input member driven by the drive power source is transmitted to a shift input member via the fluid coupling and a rotation of the shift input member is shifted by the transmission apparatus and then transmitted to an output member. When a state shift command for shifting from a non-transmission state to a transmission state is input into a control apparatus in a state in which the drive power source does not generate a driving force, the control apparatus performs a shift input rotation operation before engaging a frictional engagement element and shifting to the transmission state by causing the drive power source to generate the driving force and rotating the shift input member via the fluid coupling while maintaining the non-transmission state.

6 Claims, 8 Drawing Sheets

FIG.4

| | | C1 | C2 | C3 | C4 | B1 | B2 | F1 |
|---|---|---|---|---|---|---|---|---|
| P/N | Ntl | | | | | | | |
| D | 1st | ○ | | | | | | △ |
| | 2nd | ○ | | | | ○ | | |
| | 3rd | ○ | | ○ | | | | |
| | 4th | ○ | | | ○ | | | |
| | 5th | ○ | ○ | | | | | |
| | 6th | | ○ | | ○ | | | |
| | 7th | | ○ | ○ | | | | |
| | 8th | | ○ | | ○ | | | |
| R | Rev1 | | | ○ | | | ○ | |
| | Rev2 | | | | ○ | | ○ | |

ROTATION STOPPED

C1 ENGAGED WITHOUT
ALIGNMENT→ROTATION

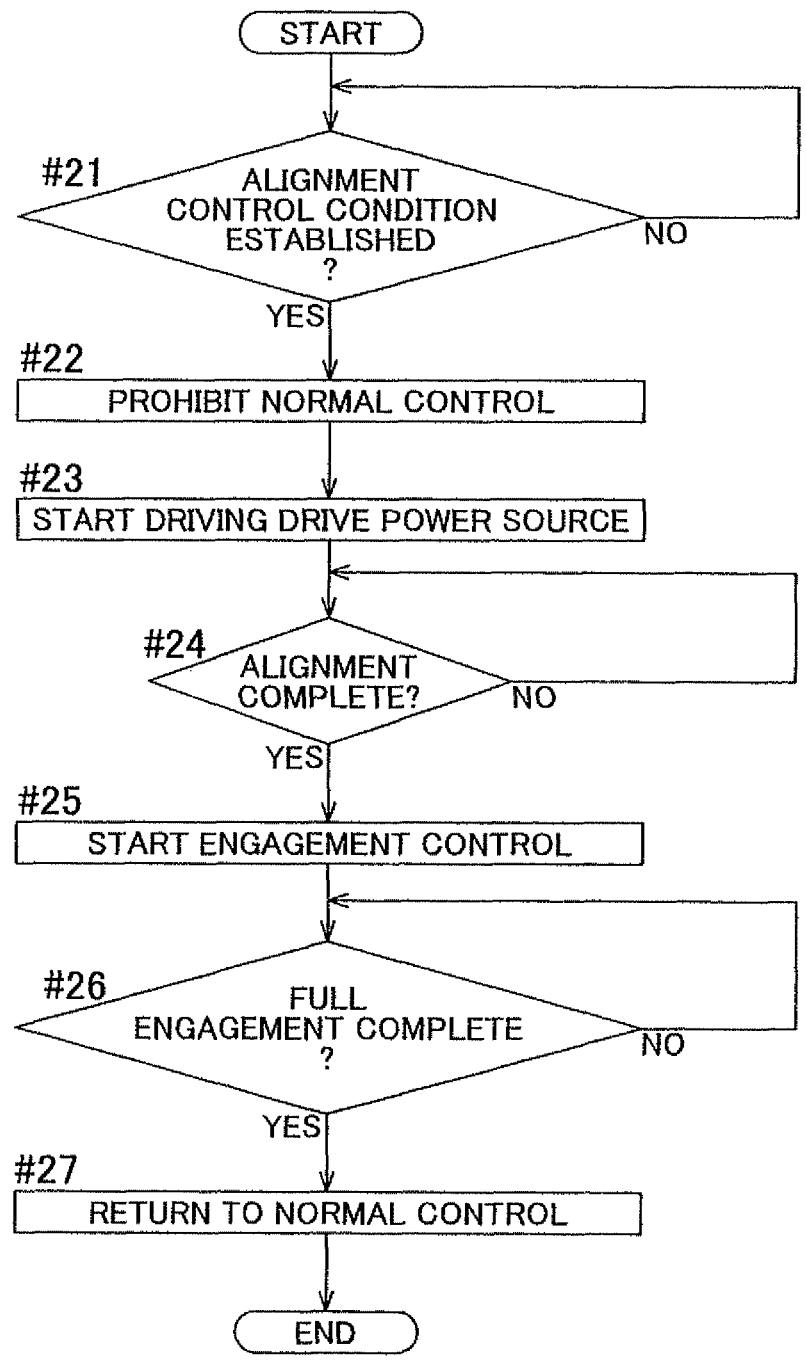

VEHICLE DRIVING APPARATUS

INCORPORATION BY REFERENCE

The disclosure of Japanese Patent Application No. 2010-042891 filed on Feb. 26, 2010 including the specification, drawings and abstract is incorporated herein by reference in its entirety.

BACKGROUND OF THE INVENTION

The present invention relates to a vehicle driving apparatus that includes a drive power source, a fluid coupling, a transmission apparatus, and a control apparatus for controlling at least the drive power source and the transmission apparatus, in which a rotation of a drive input member driven by the drive power source is transmitted to a shift input member via the fluid coupling and a rotation of the shift input member is shifted by the transmission apparatus and then transmitted to an output member.

DESCRIPTION OF THE RELATED ART

In recent years, hybrid vehicles that use both an internal combustion engine and a rotating electrical machine as drive power sources have become popular. In this type of hybrid vehicle, internal combustion engine stopping control for stopping the internal combustion engine during vehicle stoppage, deceleration, and so on is performed actively to achieve reductions in a power consumption and an exhaust gas amount of the internal combustion engine. Internal combustion engine stopping control for stopping the internal combustion engine during vehicle stoppage, deceleration, and so on may be performed similarly in a conventional vehicle that uses only an internal combustion engine as a drive power source, and this type of vehicle is typically known as an idling stop vehicle.

A unique problem may arise in cases where a hybrid vehicle or an idling stop vehicle includes a transmission apparatus having frictional engagement elements such as clutches and brakes. Specifically, a plurality of rotary elements such as gears and shafts are included in the interior of the transmission apparatus, and required gaps that allow appropriate rotation and lubrication are provided between the rotary elements. In a state where rotation of all of the rotary elements in the interior of the transmission apparatus is stopped, an axial center alignment function generated by rotation of the rotary elements and a lubricating oil pressure does not act, and therefore gravity causes each rotary element to move downward by an amount corresponding to the gap. As a result, the respective rotary elements in the interior of the transmission apparatus become eccentric, whereby constitutional members of the frictional engagement elements supported by the eccentric rotary elements also become eccentric. When a frictional engagement element of the transmission apparatus is switched from a disengaged state to an engaged state in preparation for vehicle startup, acceleration, or the like from this state, a first side member and a second side member of the frictional engagement element, which are engaged to each other, engage with each other in offset axial center positions. The axial center positions of the respective rotary elements are regulated by the frictional engagement element engaged in the offset axial center position, and therefore, even when rotation speeds of the rotary elements increase subsequently or lubricating oil pressure is supplied thereto, the axial center positions are not aligned and remain offset. When the vehicle is caused to travel while the rotary elements in the interior of the transmission apparatus are offset in this manner, lubricating oil cannot be supplied appropriately to a bearing and so on of the rotary elements, and as a result, the rotary elements may become partially worn and noise may be generated from the transmission apparatus.

In response to this problem, Japanese Patent Application No. 2006-105288 (pages 8-10), for example, describes the following technique with respect to a hybrid vehicle having both an internal combustion engine and a rotating electrical machine as drive power sources. In this hybrid vehicle, when a shift lever is operated such that a shift position is shifted from a P position to a D position, control is performed to output an alignment torque from a motor connected to a transmission decoupled from an axle side, rotate respective rotary elements of the transmission to achieve alignment, and then engage a brake to switch the transmission to a Lo-gear state. Thus, the rotational center of each rotary element of the transmission is prevented from becoming eccentric, and problems caused as a result can be avoided.

SUMMARY OF THE INVENTION

In a constitution of related art such as that described above, to prevent a situation in which a brake of a transmission is engaged in a state where an alignment torque is output to a rotating electrical machine such that a torque of the rotating electrical machine is transmitted to a vehicle wheel, control is performed to reduce the torque output by the rotating electrical machine progressively in synchronization with progressive increases in an engagement pressure of the brake. When this control is performed, however, it is difficult to control the engagement pressure of the brake with a high degree of precision, and it is therefore difficult to suppress torque transmission to the vehicle wheel side. Hence, in the conventional constitution, to ensure that the vehicle wheel is not rotated unintentionally even when the torque of the rotating electrical machine is transmitted to the vehicle wheel side, control is performed to confirm that a parking lock mechanism is in a locked state and then output the alignment torque to the rotating electrical machine while maintaining the locked state. With this constitution, however, processing is required to perform an engagement operation on the parking lock and confirm engagement thereof, and therefore an increase in processing complexity occurs. Further, once the brake has been engaged, the vehicle can only be started after the parking lock has been released, and therefore a delay occurs in a startup operation.

Hence, demand exists for a vehicle driving apparatus capable of suppressing engagement of a frictional engagement element in a state where a rotary axis center of a transmission rotary element provided in a transmission apparatus is eccentric, simplifying control for achieving this, and quickly realizing a state in which a driving force from a drive power source can be transmitted to a vehicle wheel side.

A vehicle driving apparatus according to a first aspect of the present invention includes a drive power source, a fluid coupling, a transmission apparatus, and a control apparatus for controlling at least the drive power source and the transmission apparatus. In the vehicle driving apparatus, a rotation of a drive input member driven by the drive power source is transmitted to a shift input member via the fluid coupling and a rotation of the shift input member is shifted by the transmission apparatus and then transmitted to an output member, the transmission apparatus includes a plurality of transmission rotary elements and at least one frictional engagement element such that when the frictional engagement element is set in an engaged state, a transmission state in which the rotation of the shift input member is transmitted to the output member is established, and when the frictional engagement element is set in a disengaged state, a non-transmission state in which the rotation of the shift input member is not transmitted to the output member is established, and when a state shift command for shifting from the non-transmission state to the transmission state is input into the control apparatus in a state where the drive power source does not generate a driving force, the control apparatus performs a shift input rotation operation before engaging the frictional engagement element and shifting to the transmission state by causing the drive power source to generate the driving force in order to rotate the drive input member and rotating the shift input member via the fluid coupling while maintaining the non-transmission state.

In this application, "drive power source" refers to various types of power sources capable of generating the driving force, for example a rotating electrical machine, an internal combustion engine, a combination thereof, and so on, but preferably refers to a device capable of serving as a drive power source for a vehicle. Here, the term "rotating electrical machine" is used as a concept encompassing all of a motor, a generator, and a motor/generator that functions as both a motor and a generator as required. Further, the term "fluid coupling" according to this application is used as a concept including a well-known torque converter typically employed in an automatic transmission apparatus and so on.

According to the first aspect, an alignment operation for aligning the rotary axis center position of at least a part of the plurality of transmission rotary elements can be performed before engaging the frictional engagement element and shifting to the transmission state by causing the drive power source to generate driving force in order to rotate the drive input member and rotating the shift input member via the fluid coupling. Therefore, the frictional engagement element can be engaged in a state where the rotary axis centers of the transmission rotary elements are aligned. As a result, problems arising when the frictional engagement element is engaged while the rotary axis centers of the transmission rotary elements are eccentric can be suppressed. Here, a condition for performing the shift input rotation operation is that the state shift command for shifting the transmission apparatus from the non-transmission state to the transmission state is input in a state where the drive power source does not generate the driving force, and therefore alignment can be performed appropriately in a situation where the rotary axis centers of the transmission rotary elements may be eccentric.

Further, according to the first aspect, rotation of the drive input member generated by the driving force of the drive power source is transmitted to the shift input member via the fluid coupling during the shift input rotation operation. Hence, even if the drive power source is generating the driving force when the frictional engagement element is engaged to shift the transmission apparatus to the transmission state, differential rotation exists between an input side and an output side of the fluid coupling, and therefore the rotation of the drive input member can be prevented from being transmitted directly to the shift input member, whereby variation in the driving force transmitted to the output member can be suppressed. Further, by providing differential rotation in the fluid coupling in this manner, rotation of the drive input member by the driving force of the drive power source is permitted even when rotation of the output member is stopped by a wheel brake or the like for stopping a vehicle wheel. Accordingly, there is little need to perform control for suppressing driving force transmission to the output member by controlling the driving force of the drive power source with a high degree of precision in synchronization with an engagement pressure of the frictional engagement element. Moreover, the need to fix the output member using a mechanical fixing mechanism such as a parking lock is low. Hence, the control required in the shift input rotation operation can be simplified in comparison with the related art, and a state in which the driving force of the drive power source can be transmitted to the vehicle wheel side can be realized quickly.

Here, according to a second aspect of the present invention, the vehicle driving apparatus may further include a lock mechanism that can be switched between a rotation fixed state in which a rotation of the output member is mechanically fixed and a fix released state in which the fix is released, and when the lock mechanism is in the rotation fixed state during the shift input rotation operation, the control apparatus may switch the lock mechanism to the fix released state before causing the drive power source to generate the driving force.

According to the second aspect, when the vehicle driving apparatus includes the lock mechanism capable of fixing the rotation of the output member mechanically, the lock mechanism is set in the fix released state before the drive power source is caused to generate the driving force during the shift input rotation operation, and therefore, in comparison with a case where the lock mechanism is set in the fix released state after the shift input rotation operation is complete, a state in which the driving force of the drive power source can be transmitted to the vehicle wheel side can be realized quickly.

Further, according to a third aspect of the present invention, the control apparatus may include a drive control unit for controlling a driving state of the drive power source, and the drive control unit may stop generation of a driving force by the drive power source when an increase in a rotation speed difference between the drive input member and the shift input member via the fluid coupling is detected after starting to shift the frictional engagement element to the engaged state. Furthermore, the drive control unit may cause the drive power source to generate the driving force on the basis of the state shift command for shifting from the non-transmission state to the transmission state.

According to the vehicle driving apparatus according to the third aspect, the rotation of the drive input member driven by the drive power source is transmitted to the shift input member via the fluid coupling. Therefore, when shifting of the frictional engagement element to the engaged state begins such that a transmission torque capacity of the frictional engagement element increases, a rotation speed of the shift input member varies in a direction approaching a rotation speed of the output member. As a result, the rotation speed difference (differential rotation) between the drive input member serving as an input side member of the fluid coupling and the shift input member serving as an output side member of the fluid coupling increases. According to this constitution, the beginning of an increase in the transmission torque capacity of the frictional engagement element of the transmission apparatus accompanying the start of engagement can be detected appropriately, and generation of the driving force by the drive power source can be stopped on the basis thereof. Hence, variation in the driving force transmitted to the output member can be suppressed even further, and wasteful energy consumption occurring when the drive power source is driven after alignment of the transmission rotary elements is complete can be suppressed.

Further, instead of the control executed by the engagement control unit described above, in the constriction according to a fourth aspect in which the control apparatus includes an engagement control unit for controlling an engagement state of the frictional engagement element, after the state shift command for shifting from the non-transmission state to the transmission state has been input and a predetermined engagement start condition has been satisfied, the engagement control unit may perform control such that an engagement pressure of the frictional engagement element becomes a partial engagement pressure at which the frictional engagement element enters a partially engaged state, and after an increase is detected in the rotation speed difference between the drive input member and the shift input member, the engagement control unit may increase the engagement pressure of the frictional engagement element beyond the partial engagement pressure such that the frictional engagement element enters a fully engaged state.

According to the fourth aspect, first, the frictional engagement element is set in the partially engaged state, and then the frictional engagement element is shifted to the fully engaged state after detecting the start of an increase in the transmission torque capacity of the frictional engagement element caused by an increase in the rotation speed difference between the drive input member and the shift input member. As a result, variation in the transmission torque capacity of the frictional engagement element can be suppressed to a low level, and therefore variation in the driving force transmitted to the output member can be suppressed even further. Moreover, by setting the engagement start condition to correspond to a completion condition of the shaft input rotation operation, the frictional engagement element is shifted to the partially engaged state and the fully engaged state following completion of the shift input rotation operation, and therefore the transmission apparatus can be shifted to the transmission state after reliably completing alignment through the shift input rotation operation.

Further, according to a fifth aspect of the present invention, the engagement start condition may be defined by a time period based on an input timing of the state shift command for shifting from the non-transmission state to the transmission state, or a rotation speed of the shift input member.

According to the fifth aspect, the engagement start condition can be set as an easily detectable condition. Here, the alignment operation can be performed appropriately by rotating the shift input member serving as the input side member of the transmission apparatus at a predetermined rotation speed. Therefore, by setting the engagement start condition to the time for which the shift input member reaches the predetermined rotation speed by rotating the drive input member using the driving source generated by the drive power source, or the predetermined rotation speed of the shift input member itself, the engagement start condition may be set appropriately to correspond to the completion condition of the shift input rotation operation.

Further, according to a sixth aspect of the present invention, the state shift command may be input into the control apparatus on the basis of an operation of a switching operation unit for receiving at least an operation to switch the transmission apparatus between the transmission state and the non-transmission state. According to the sixth aspect, the shift input rotation operation can be started appropriately on the basis of an operation by a driver of the vehicle.

BRIEF DESCRIPTION OF THE DRAWINGS

FIG. 4 is a view showing an operating table of the transmission according to an embodiment of the present invention;

FIG. 9 is a flowchart showing the processing performed by the control apparatus according to the second embodiment of the present invention.

DETAILED DESCRIPTION OF THE EMBODIMENTS

1. First Embodiment

Figure 1:
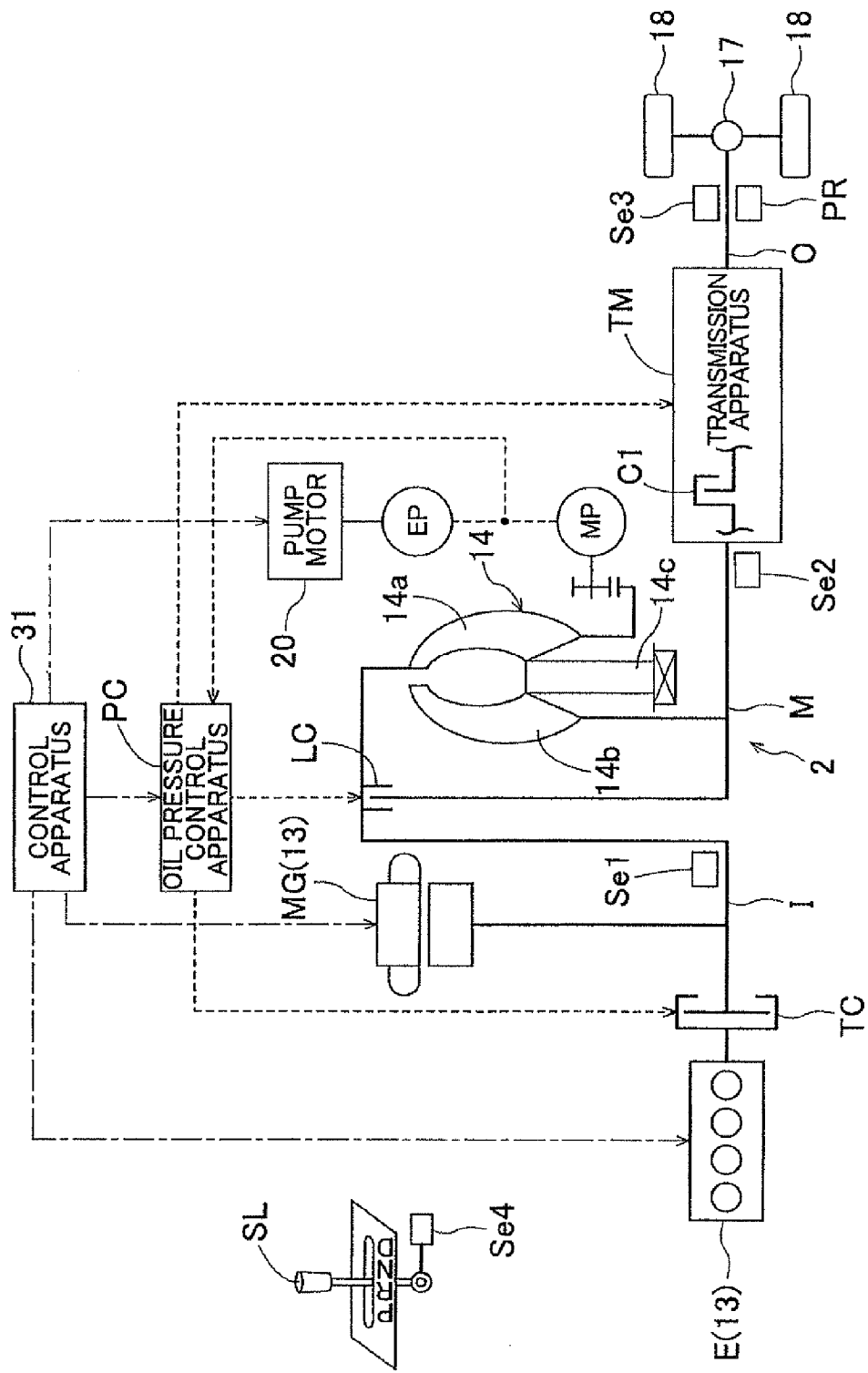
FIG. 1 is a pattern diagram showing the constitution of a vehicle driving apparatus according to an embodiment of the present invention.

A first embodiment of the present invention will now be described on the basis of the drawings. In this embodiment, a case in which a control apparatus 31 according to the present invention is applied to a vehicle driving apparatus 2 for a hybrid vehicle will be described as an example. FIG. 1 is a pattern diagram showing an outline of the constitution of the vehicle driving apparatus 2 according to this embodiment. Note that in FIG. 1, solid lines indicate driving force (torque) transmission paths, dotted lines indicate supply paths for a working oil command pressure or a working oil, and dot-dash lines indicate electric signal transmission paths. As shown in the drawing, the vehicle driving apparatus 2 according to this embodiment basically includes an engine E and a rotating electrical machine MG serving as drive power sources 13, a torque converter 14 serving as a fluid coupling, a transmission apparatus TM, and the control apparatus 31 for controlling at least the drive power sources 13 and the transmission apparatus TM. A rotation of an input shaft I serving as a drive input member driven by the drive power sources 13 is transmitted to an intermediate shaft M serving as a shift input member via the torque converter 14, and a rotation of the shift input member is shifted by the transmission apparatus TM and then transmitted to an output shaft O serving as an output member. The vehicle driving apparatus 2 further includes an oil pressure control apparatus PC that is controlled by the control apparatus 31 to supply a working oil command pressure to respective hydraulic operating units such as the transmission apparatus TM, the torque converter 14, and a transmission clutch TC.

The vehicle driving apparatus 2 includes an input shaft rotation speed sensor Se1, an intermediate shaft rotation speed sensor Se2, and an output rotation speed sensor Se3 for detecting the respective rotation speeds of the input shaft 1, the intermediate shaft M, and the output shaft O. The vehicle driving apparatus 2 also includes a shift position sensor Se4 for detecting a selected position (to be referred to hereafter as a "shift position") of a shift lever SL that serves as a switch operation unit for receiving an operation to switch the state of the transmission apparatus TM. Outputs from the respective sensors Se1 to Se4 are input into the control apparatus 31. In this embodiment, a "P (parking) range", an "R (reverse) range", an "N (neutral) range", and a "D (drive) range" can be selected by the shift lever SL. From among these ranges, the "P range" and the "N range" correspond to a non-transmission state according to the present invention since the rotation of the intermediate shaft M is not transmitted to the output shaft O in these ranges, whereas the "D range" and the "R range" correspond to a transmission state according to the present invention since the rotation of the intermediate shaft M is transmitted to the output shaft O in these ranges. On the basis of the shift position detected by the shift position sensor Se4, the control apparatus 31 at least switches the transmission apparatus TM between the transmission state (here, the D and R ranges) and the non-transmission state (here, the P and N ranges). Further, the vehicle driving apparatus 2 includes a parking lock mechanism PR serving as a lock mechanism that is capable of switching between a rotation fixed state in which the rotation of the output shaft O serving as the output member is mechanically fixed and a fix released state in which the fix is released. The control apparatus 31 switches the parking lock mechanism PR between the rotation fixed state and the fix released state.

1-1. Constitution of Drive Transmission System of Vehicle Driving Apparatus 1-1-1. Drive Power Source In this embodiment, as shown in FIG. 1, the vehicle driving apparatus 2 is a parallel-type hybrid vehicle driving apparatus in which the engine E and the rotating electrical machine MG are provided as the drive power sources 13 for driving the vehicle and the engine E and the rotating electrical machine MG are coupled in series via the transmission clutch TC. The engine E is an internal combustion engine driven by fuel combustion, and may employ various well-known engines such as a gasoline engine or a diesel engine, for example. The rotating electrical machine MG is capable of functioning as a motor (electric motor) that generates motive power upon reception of a supply of electric power and a generator that generates electric power upon reception of a supply of motive power. Accordingly, the rotating electrical machine MG is electrically connected to a storage apparatus such as a battery or a capacitor, not shown in the drawings. A rotor of the rotating electrical machine MG is formed to rotate integrally with the input shaft I. The transmission clutch TC for selectively coupling the engine E to the input shaft I is provided between the engine E and the rotating electrical machine MG. The transmission clutch TC operates upon reception of a supply of working oil command pressure from the oil pressure control apparatus PC.

1-1-2. Transmission Clutch

In the vehicle driving apparatus 2 according to this embodiment, during vehicle startup or low-speed travel, the transmission clutch TC is disengaged and the engine E is stopped such that only the driving force of the rotating electrical machine MG is transmitted to a vehicle wheel 18 to cause the vehicle to travel. At this time, the rotating electrical machine MG generates driving force by receiving a supply of power from the storage apparatus, not shown in the drawings. When a rotation speed of the rotating electrical machine MG has reached or exceeded a fixed rotation speed, the transmission clutch TC is engaged such that the engine E is cranked and started. Following startup of the engine E, the driving force of both the engine E and the rotating electrical machine MG is transmitted to the vehicle wheel 18 to cause the vehicle to travel. Depending on a charging state of the storage apparatus, not shown in the drawings, at this time the rotating electrical machine MG may either generate power using the driving force of the engine E or generate driving force using power supplied from the storage apparatus. Further, when the vehicle decelerates, the transmission clutch TC is disengaged and the engine E is stopped such that the rotating electrical machine MG generates power using driving force transmitted from the vehicle wheel 18. The power generated by the rotating electrical machine MG is stored in the storage apparatus, not shown in the drawings. When the vehicle is stopped, the transmission clutch TC is disengaged and the engine E is stopped, and therefore only the driving force of the rotating electrical machine MG can be transmitted to the transmission apparatus TM via the torque converter 14.

1-1-3. Torque Converter

The vehicle driving apparatus 2 also includes the torque converter 14 and the transmission apparatus TM for transmitting the driving force from the drive power sources 13 to the vehicle wheel 18 side. The transmission apparatus TM is provided between the drive power sources 13 and the vehicle wheel 18, and shifts the driving power from the drive power sources 13 transmitted thereto via the torque converter 14 and then transmits the shifted driving force to the vehicle wheel 18 side. The torque converter 14 is provided between the drive power sources 13 and the transmission apparatus TM, and transmits the driving force of the input shaft I to the transmission mechanism TM via the intermediate shaft M. In this embodiment, the torque converter 14 corresponds to a fluid coupling according to the present invention.

The torque converter 14 includes a pump impeller 14$a$ serving as an input side rotary member coupled to the input shaft I, a turbine runner 14$b$ serving as an output side rotary member coupled to the intermediate shaft M, and a stator 14$c$ that is provided between the pump impeller 14$a$ and the turbine runner 14$b$ and includes a one-way clutch. The torque converter 14 transmits driving force between the input side (drive side) pump impeller 14$a$ and the output side (driven side) turbine runner 14$b$ via a working oil charged into the interior thereof. As a result, a torque difference and a rotation speed difference are normally generated between drive side and driven side rotary shafts. The torque converter 14 also includes a lockup clutch LC serving as a lockup frictional engagement mechanism. The lockup clutch LC eliminates differential rotation (slippage) between the pump impeller 14$a$ and the turbine runner 14$b$ thereby increasing a transmission efficiency, by coupling the pump impeller 14$a$ to the turbine runner 14$b$ so that the pump impeller 14$a$ and the turbine runner 14$b$ rotate integrally. When the lockup clutch LC is in an engaged state, the torque converter 14 transmits the driving force of the drive power sources 13 (the input shaft I) to the transmission apparatus TM (the intermediate shaft M) directly, i.e. not via the working oil, and therefore the torque difference and the rotation speed difference do not occur between the drive side and driven side rotary shafts. The lockup clutch LC operates upon reception of a working oil command pressure supplied by the oil pressure control apparatus PC.

In the torque converter 14, similarly to a torque converter of a typical automatic transmission apparatus, the lockup clutch LC is disengaged when a shift speed of the transmission apparatus TM is switched such that the driving force is transmitted via the working oil. Further, in this embodiment, the lockup clutch LC is disengaged when the vehicle is stopped such that the driving force is transmitted via the working oil, When the vehicle is started using only the driving force of the rotating electrical machine MG, the lockup clutch LC is engaged after a switch to a startup shift speed (in this embodiment, a first shift speed) is completed in the transmission apparatus TM, whereupon the vehicle is started using the driving force of the rotating electrical machine MG.

1-1-4. Transmission Apparatus

The transmission apparatus TM includes a plurality of transmission rotary elements and at least one frictional engagement element, and is constituted to enter a transmission state in which the rotation of the intermediate shaft M is transmitted to the output shaft O when the frictional engagement element is engaged and to enter a non-transmission state in which the rotation of the intermediate shaft M is not transmitted to the output shaft O when the frictional engagement element is disengaged.

The transmission apparatus TM according to this embodiment is a stepped automatic transmission apparatus that includes a plurality of shift speeds having different shift ratios. To form the plurality of shift speeds, the transmission apparatus TM includes rotary members such as respective gears of a planetary gear mechanism or another gear mechanism as well as a rotary shaft, a bearing, and a hub, which together serve as the transmission rotary elements, and frictional engagement elements such as a clutch and a brake, which together serve as the frictional engagement elements. The frictional engagement elements are respectively constituted by a friction material. Note that the transmission rotary elements also include drums, hubs, pistons, friction material, and so on constituting the frictional engagement elements. Increases and decreases in a transmission torque capacity of the frictional engagement elements can be controlled continuously by controlling an oil pressure supplied thereto. A multiplate wet clutch, a multiplate wet brake, a dry clutch, a dry brake, and so on, for example, may be employed favorably as the frictional engagement elements. FIG. 1 shows an outline of a first clutch C1 serving as an example of a frictional engagement element.

The respective frictional engagement elements of the transmission apparatus TM operate upon reception of a working oil command pressure supplied from the oil pressure control apparatus PC. By engaging and disengaging the plurality of frictional engagement elements selectively, a driving force transmission state to the plurality of transmission rotary elements provided in the gear mechanism is switched, and as a result, the shift speed is switched. When one of the shift speeds is formed, the transmission apparatus TM enters the transmission state in which the rotation of the intermediate shaft M is transmitted to the output shaft O. When all of the frictional engagement elements are disengaged, on the other hand, the transmission apparatus TM enters the non-transmission state in which the rotation of the intermediate shaft M is not transmitted to the output shaft O. The transmission apparatus TM shifts the rotation speed of the intermediate shaft M at a predetermined shift ratio set for each shift speed, and also converts a torque and transmits the converted torque to the output shaft O. The driving force transmitted to the output shaft O from the transmission apparatus TM is transmitted to the vehicle wheel 18 via a differential apparatus 17.

Figure 3:
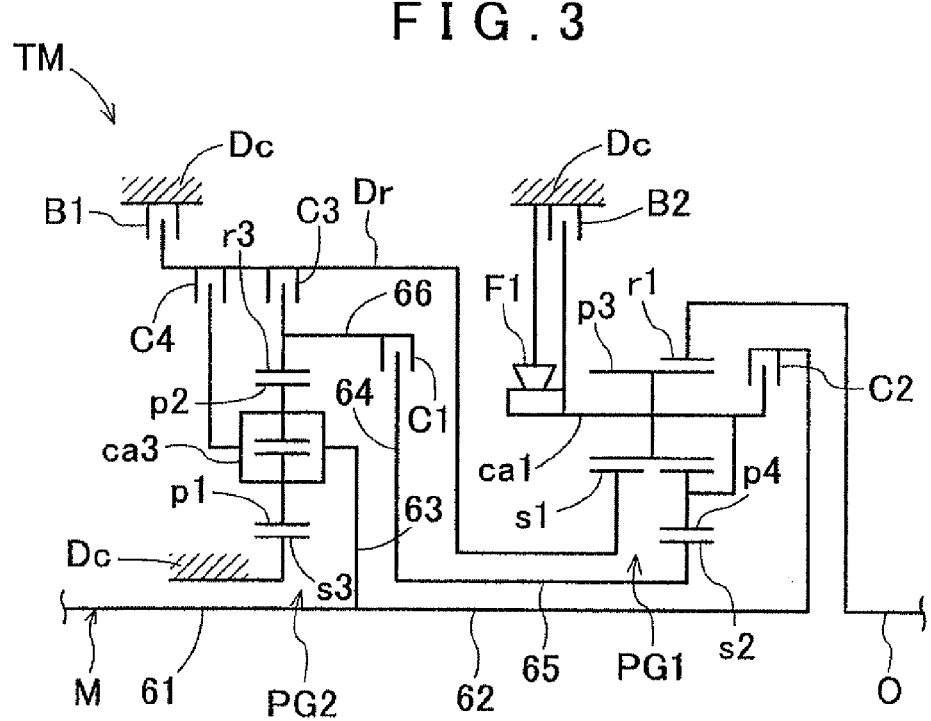
FIG. 3 is a skeleton diagram of a transmission according to an embodiment of the present invention.

FIG. 3 is a skeleton diagram showing the transmission apparatus TM according to this embodiment. As shown in the drawing, the transmission apparatus TM includes a planetary gear apparatus formed by combining two differential gear apparatuses PG1, PG2. The transmission apparatus TM also includes a plurality of frictional engagement elements C1, C2, C3, C4, B1, B2, F1 corresponding to rotary elements constituting the planetary gear apparatuses. More specifically, the transmission apparatus TM includes, as the frictional engagement elements, the first clutch C1, a second clutch C2, a third clutch C3, a fourth clutch C4, a first brake B1, a second brake B2, and a one-way clutch F1.

FIG. 4 is a view showing an operating table of the frictional engagement elements C1, C2, C3, C4, B1, B2, F1. On the operating table shown in this drawing, a circle indicates that the corresponding frictional engagement element is engaged, a blank indicates that the corresponding frictional engagement element is disengaged, and a triangle indicates that the one-way clutch F1 is operative. Note that the one-way clutch F1 is engaged during vehicle startup employing the first shift speed. As shown on the operating table, in the transmission apparatus TM, the respective shift speeds are selected by engaging any two frictional engagement elements and disengaging the remaining frictional engagement elements.

Note that in FIG. 4, "$1^{st}$" indicates the first shift speed, "$2^{nd}$" indicates a second shift speed, "$3^{rd}$" indicates a third shift speed, "$4^{th}$" indicates a fourth shift speed, "$5^{th}$" indicates a fifth shift speed, "$6^{th}$" indicates a sixth shift speed, "$7^{th}$" indicates a seventh shift speed, "$8^{th}$" indicates an eighth shift speed, "Rev1" indicates a first reverse shift speed, and "Rev2" indicates a second reverse shift speed. In this embodiment, the first shift speed, second shift speed, . . . , eighth shift speed are set in descending order of the shift ratio at which the rotation of the intermediate shaft M is transmitted to the output shaft O. This applies similarly to the reverse shift speeds such that the first reverse shift speed (Rev1) and the second reverse shift speed (Rev2) are set in descending order of the shift ratio. The shift speeds from the first shift speed ($1^{st}$) to the eighth shift speed ($8^{th}$) are selected by the control apparatus 31 when the "D range" is selected as the shift position. The first reverse shift speed (Rev1) and the second reverse shift speed (Rev2) are selected by the control apparatus 31 when the "R range" is selected as the shift position. When the "P range" or the "N range" is selected as the shift position, all of the frictional engagement elements are disengaged, as shown in FIG. 4. In this embodiment, this state of the transmission apparatus TM will be referred to, for convenience, as a neutral speed (Ntl). When the neutral speed (Ntl) is selected in the "P range" or the "N range", the transmission apparatus TM enters the non-transmission state. On the other hand, when one of the first shift speed ($1^{st}$) to the eighth shift speed ($8^{th}$) or one of the first reverse shift speed (Rev1) and the second reverse shift speed (Rev2) is selected in the "D range" or the "R range", the transmission apparatus TM enters the transmission state. For example, when a state switch command is input to operate the shift lever SL from the "P range" or the "N range" (the non-transmission state) to the "D range" (the transmission state) in a state where the engine E and the rotating electrical machine MG serving as the drive power sources 13 does not generate a driving force, a switch is performed from the neutral speed (Ntl) to the first shift speed ($1^{st}$). At this time, the first shift speed ($1^{st}$) is formed by engaging the first clutch C1 alone. Hence, in this case, the first clutch C1 corresponds to the at least one frictional engagement element according to the present invention.

Next, returning to FIG. 3, the skeleton diagram of the transmission apparatus TM according to this embodiment will be described. The second differential gear apparatus PG2 is constituted by a double pinion type planetary gear mechanism disposed coaxially with the intermediate shaft M. More specifically, the second differential gear apparatus PG2 includes three rotary elements, namely a carrier ca3 that supports a plurality of sets of pinion gears, and a sun gear s3 and a ring gear r3 that mesh respectively with the pinion gears.

The carrier ca3 of the second differential gear apparatus PG2 is connected to the intermediate shaft M so as to rotate integrally therewith, and transmits the driving force of the intermediate shaft M to the second differential gear apparatus PG2. Further, the sun gear s3 of the second differential gear apparatus PG2 is fixed to a case Dc. Hence, the respective rotary elements of the second differential gear apparatus PG2 are rotated by the rotation of the intermediate shaft M. In the neutral speed (Ntl) when all of the frictional engagement elements engaged to the second differential gear apparatus PG2 are disengaged, the respective rotary elements of the second differential gear apparatus PG2 in particular are rotated by the rotation of the intermediate shaft M, but no driving force is transmitted to the output shaft O.

Meanwhile, the first differential gear apparatus PG1 is constituted by a Ravigneaux type planetary gear apparatus disposed coaxially with the intermediate shaft M. Here, a Ravigneaux type planetary gear apparatus is an apparatus in which a single pinion type planetary gear mechanism employing a pinion gear p3 and a double pinion type planetary gear apparatus employing a set of pinion gears p3, p4 share the pinion gear p3, a carrier ca1, and a ring gear r1. More specifically, the first differential gear apparatus PG1 includes four rotary elements, namely two sun gears constituted by a first sun gear s1 and a second sun gear s2, the ring gear r1, and the shared carrier ca1 for supporting a long pinion gear p3 that meshes with both the first sun gear s1 and the ring gear r1 and a short pinion gear p4 that meshes with the long pinion gear p3 and the second sun gear s2.

When the first clutch C1 is engaged, the torque of the intermediate shaft M transmitted to the second differential gear apparatus PG2 is input into the second sun gear s2 of the first differential gear apparatus PG1 from the ring gear r3 of the second differential gear apparatus PG2. When the frictional engagement elements other than the first clutch C1 are disengaged, the one-way clutch F1 is engaged by the driving force input into the second sun gear s2 of the first differential gear apparatus PG1, and the driving force input into the second sun gear s2 is transmitted to the output shaft O from the ring gear r1 via the second differential gear apparatus PG2. A torque transmission path established at this time constitutes the first shift speed. Note that the one-way clutch F1 functions as a one-way engagement element that is engaged and thereby prevented from rotating when the carrier ca1 switches to negative rotation. Thus, the one-way clutch F1 selectively fixes the carrier ca1 to the case Dc such that the carrier ca1 is stopped.

Meanwhile, the ring gear r3 of the second differential gear apparatus PG2 is selectively connected to a brake drum Dr and the first sun gear s1 of the first differential gear apparatus PG1, which rotates integrally with the brake drum Dr, via the third clutch C3. The carrier ca3 is selectively connected to the brake drum Dr and the first sun gear s1 of the first differential gear apparatus PG1, which rotates integrally with the brake drum Dr, via the fourth clutch C4. Here, the brake drum Dr is a cylindrical rotary member disposed on the engine E side (the left side in FIG. 3) of the first differential gear apparatus PG1, and the first brake B1 is provided on an outer periphery of the brake drum Dr. Further, the third clutch C3 and fourth clutch C4 are provided on an inner periphery of the brake drum Dr, while the second differential gear apparatus PG2 and the first clutch C1 are provided further to the inside thereof in a radial direction. The brake drum Dr is connected to the first sun gear s1 on an output shaft O side end portion so as to rotate integrally therewith. Further, the first sun gear s1 is fixed selectively to the case Dc via the first brake B1. Furthermore, the first sun gear s1 is connected selectively to the ring gear r3 of the second differential gear apparatus PG2 via the third clutch C3 and connected selectively to the carrier ca3 of the second differential gear apparatus PG2 via the fourth clutch C4. The carrier ca1 is fixed selectively to the case Dc via the second brake B2 and connected selectively to the intermediate shaft M via the second clutch C2. As described above, the one-way clutch F1 selectively fixes the carrier ca1 to the case Dc such that the carrier ca1 is stopped.

Hence, by engaging the third clutch C3, the torque of the intermediate shaft M, which is transmitted to the ring gear r3 from the carrier ca3 of the second differential gear apparatus PG2, is input into the first sun gear s1 of the first differential gear apparatus PG1 via the third clutch C3. Further, by engaging the fourth clutch C4, the torque of the intermediate shaft M is input into the first sun gear s1 via the fourth clutch C4. Furthermore, by engaging the second clutch C2, the torque of the intermediate shaft M is input into the carrier ca1 of the first differential gear apparatus PG1 via the second clutch C2. By engaging these frictional engagement elements selectively on the basis of the operating table shown in FIG. 4, each of the shift speeds is formed.

1-1-5. Parking Lock Mechanism

As shown in outline in FIG. 1, the parking lock mechanism PR, which serves as a lock mechanism that is capable of switching between the rotation fixed state in which the rotation of the output shaft O is mechanically fixed and the fix released state in which the fix is released, is attached to the output shaft O. In this embodiment, the parking lock mechanism PR is constituted by a parking gear (not shown) attached to the output shaft O and a parking lock pawl (not shown) that meshes with the parking gear such that the parking gear is fixed in a non-rotating condition, for example. The parking lock pawl is operated by a command from the control apparatus 31, an operation of the shift lever SL, or similar, and by meshing and releasing the parking gear, the parking lock mechanism PR is switched between the rotation fixed state and the fix release state.

2. Constitution of Oil Pressure Control Apparatus

Next, the oil pressure control apparatus PC of the vehicle driving apparatus 2 will be described. The oil pressure control apparatus PC includes two types of pumps, namely a mechanical pump MP and an electric pump EP, which serve as oil pressure sources for suctioning working oil stored in an oil pan, not shown in the drawings, and supplying the working oil to various parts of the vehicle driving apparatus 2. In this example, the mechanical pump MP is drive-coupled to the pump impeller 14a of the torque converter 14 and driven by the driving force of the engine E or the rotating electrical machine MG. However, the mechanical pump MP does not discharge working oil when the input shaft I is stopped (for example, when the engine E and rotating electrical machine MG are stopped). Therefore, the electric pump EP is provided as a pump for assisting the mechanical pump MP.

The electric pump EP is an oil pump that is driven by driving force from a pump motor 20 to discharge working oil irrespective of the driving force of the drive power sources 13. The pump motor 20 for driving the electric pump EP is electrically connected to a battery (not shown), and generates driving force upon reception of a supply of power from the battery. The electric pump EP is a pump for assisting the mechanical pump MP, and therefore operates in a state where the vehicle is stopped such that a required amount of oil is not supplied from the mechanical pump MP. Hence, the electric pump is driven when necessary to secure the oil pressure required to engage the frictional engagement elements. In this embodiment, the input shaft I is driven to rotate by the drive power sources 13 and the mechanical pump MP is driven during an alignment operation to be described below. If the rotation speed of the input shaft I is low such that a sufficient amount of oil cannot be secured, the electric pump EP is also driven to secure the oil pressure.

The oil pressure control apparatus PC also includes a hydraulic control valve, not shown in the drawings, for regulating the oil pressure of the working oil supplied from the mechanical pump MP and the electric pump EP to a predetermined pressure. Although detailed description has been omitted, the hydraulic control valve adjusts an opening of one or more regulating valves on the basis of a signal pressure from an oil pressure-regulating linear solenoid valve, not shown in the drawings, and as a result, an amount of working oil drained from the regulating valve is regulated such that the oil pressure of the working oil is regulated to the predetermined pressure. The working oil regulated to the predetermined pressure is supplied to the transmission clutch TC, the lockup clutch LC, and the plurality of frictional engagement elements C1, C2, C3, C4, B1, B2 of the transmission apparatus TM at respectively required oil pressure levels. Note that the working oil is also supplied to the gears, shafts, bearings, and so on of the first differential gear apparatus PG1 and second differential gear apparatus PG2, i.e. the respective transmission rotary elements of the transmission apparatus TM, in order to lubricate and cool these parts. During the alignment operation to be described below, oil pressure is generated by driving the mechanical pump MP and the electric pump EP, as described above, and the respective transmission rotary elements of the transmission apparatus TM are rotated by having the drive power sources 13 rotate the intermediate shaft M via the torque converter 14. Thus, lubricating oil can be supplied to the bearings, gears, and other rotary elements of the transmission apparatus TM such that oil films are formed.

3. Constitution of Control Apparatus

Figure 2:
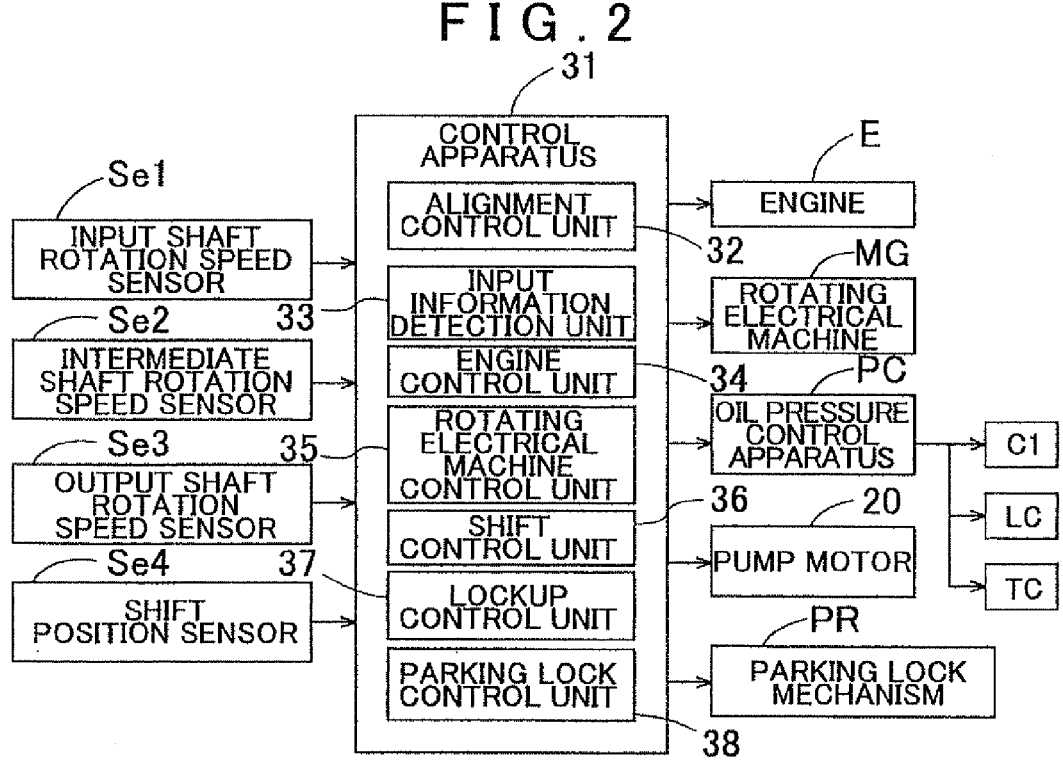
FIG. 2 is a block diagram showing the constitution of a control apparatus according to an embodiment of the present invention.

Next, the constitution of the control apparatus 31 according to this embodiment will be described. As shown in FIG. 2, the control apparatus 31 provided in the vehicle driving apparatus 2 functions as a core member for performing operation control on each part of the vehicle driving apparatus 2. The control apparatus 31 includes various function units, namely an alignment control unit 32, an input information detection unit 33, an engine control unit 34, a rotating electrical machine control unit 35, a shift control unit 36, a lockup control unit 37, and a parking lock control unit 38. In this embodiment, the control apparatus 31 controls the function units other than the alignment control unit 32 in an integrated fashion when the alignment control unit 32 performs a series of alignment control processes. When the alignment control of the alignment control unit 32 is not underway, on the other hand, the control apparatus 31 performs normal control on the other function units. Respective constitutions of the control apparatus 31 will be described in detail below.

3-1. Control Apparatus

The control apparatus 31 includes a calculation processing apparatus such as a CPU as a core member, as well as a RAM (Random Access Memory) constituted to be capable of reading and writing data from/to the calculation processing apparatus, a ROM (Read-Only Memory) constituted to be capable of reading data from the calculation processing apparatus, a storage apparatus such as a memory, and so on (not shown in the drawings). The respective function units 32 to 38 of the control apparatus 31 are constituted by software (a program) stored in the ROM or the like, hardware such as a separately provided calculation circuit, or both. The respective function units 32 to 38 are constituted to be capable of exchanging information.

Further, as shown in FIGS. 1 and 2, the vehicle driving apparatus 2 is provided with the aforementioned plurality of sensors provided for various parts, namely the input shaft rotation speed sensor Se1, intermediate shaft rotation speed sensor Se2, output rotation speed sensor Se3, shift position sensor Se4, and so on, and input information from these various sensors and the like is input into the control apparatus 31. Furthermore, the control apparatus 31 outputs electric signals for controlling the engine E, the rotating electrical machine MG; the oil pressure control apparatus PC, the pump motor 20, the parking lock mechanism PR, and so on.

3-2. Input Information Detection Unit

The input information detection unit 33 is a function unit for detecting input information from the various sensors and the like connected to the control apparatus 31. The respective function units of the control apparatus 31 use detection values detected by the input information detection unit 33 to execute various types of operation processing. The inputs of the various sensors shown in FIG. 2 will now be described. The input shaft rotation speed sensor Se1 detects the rotation speed of the input shaft I. The rotation speed detected by the input shaft rotation speed sensor Se1 corresponds to the rotation speed of the rotating electrical machine MG and a rotation speed on the input side of the torque converter 14. The intermediate shaft rotation speed sensor Se2 detects the rotation speed of the intermediate shaft M. The rotation speed detected by the intermediate shaft rotation speed sensor Se2 corresponds to a rotation speed on the output side of the torque converter 14 and a rotation speed on the input side of the transmission apparatus TM. The output shaft rotation speed sensor Se3 detects the rotation speed of the output shaft O. The rotation speed detected by the output shaft rotation speed sensor Se3 corresponds to a rotation speed on the output side of the transmission apparatus TM. Further, this rotation speed is commensurate with the vehicle speed, and therefore the input information detection unit 33 is capable of detecting the vehicle speed on the basis of this rotation speed.

Further, the shift position sensor Se4 detects the selected position (shift 20. position) of the shift lever SL. As described above, in this embodiment, the shift lever SL is capable of selecting the "P range", the "R range", the "N range", and the "D range". Accordingly, a value indicating which of the "P range", "R range", "N range" and "D range" has been selected is input into the input information detection unit 33 from the shift position sensor Se4 as a detection value of the shift position. On the basis of the input information from the shift position sensor Se4, the input information detection unit 33 determines which of the "P", "N", "D" and "R" ranges has been specified by a driver, or in other words the type of state command that has been issued. When variation occurs in the state command specifying the range, the input information detection unit 33 determines that a state shift command has been issued. In this embodiment, the "P range" and the "N range" are state commands for setting the transmission apparatus TM in the non-transmission state while the "D range" and the "R range" are state commands for setting the transmission apparatus TM in the transmission state. Hence, when the shift position is switched to the "D range" or the "R range" from the "P range" or the "N range", a state shift command for shifting from the non-transmission state to the transmission state is input into the input information detection unit 33 of the control apparatus 31.

3-3. Engine Control Unit

The engine control unit 34 is a function unit for performing operation control on the engine E. The engine control unit 34 performs control processing to operate the engine E at an engine operating point determined by the engine control unit 34, or at the engine operating point in accordance with an engine operating point command issued from other function units such as the alignment control unit 32. Here, the engine operating point is a control command value representing a target control point of the engine E, which is determined by the rotation speed and the torque. More specifically, the engine operating point is a command value that is determined in accordance with a rotation speed command value and a torque command value and represents a target control point of the engine E determined in consideration of a required vehicle output (i.e. determined on the basis of a required vehicle torque and the engine rotation speed). The engine control unit 34 controls the engine E such that the engine E operates at the torque and the rotation speed indicated by the engine operating point. The engine operating point also includes control command values for starting and stopping the engine E. When a starting control command value is issued, the engine control unit 34 executes a startup sequence such as supplying startup fuel to start the engine E. Further, when a stopping control command value is issued, the engine control unit 34 executes a stoppage sequence such as blocking the fuel supply to stop the engine E.

In this embodiment, the engine control unit 34 performs idle stop control for stopping the engine E by blocking the fuel supply to the engine E when a predetermined idle stop condition is established. During the idle stop control, the engine E is maintained in a stopped state while a main power supply of the vehicle remains ON such that travel is possible. In other words, the engine E is maintained in a stopped state while the vehicle travels or while the vehicle is stopped. In this example, the idle stop condition is determined in advance on the basis of the rotation speed of the engine E, the accelerator operation amount, the vehicle speed, and so on. For example, the idle stop condition may be determined to be established when the vehicle is stopped (the vehicle speed is zero), the output of the engine E decreases as the vehicle coasts (the rotation speed of the engine E decreases while the accelerator operation amount is no greater than a predetermined value), and so on. Note that when the idle stop condition ceases to be established, the engine control unit 34 performs control to restart the engine E by resuming fuel supply to the engine E. This control is assumed to be included in the aforesaid idle stop control.

3-4. Rotating Electrical Machine Control Unit

The rotating electrical machine control unit 35 is a function unit for performing operation control on the rotating electrical machine MG. The rotating electrical machine control unit 35 determines a rotating electrical machine operating point or receives a rotating electrical machine operating point command from another function unit such as the alignment control unit 32 and performs control processing to operate the rotating electrical machine MG at the rotating electrical machine operating point. Here, the rotating electrical machine operating point is a control command value representing a target control point of the rotating electrical machine MG, which is determined by the rotation speed and the torque. More specifically, the rotating electrical machine operating point is a command value that is determined in accordance with the rotation speed command value and the torque command value and represents a target control point of the rotating electrical machine MG determined in consideration of the required vehicle output and the engine operating point. The rotating electrical machine control unit 35 controls the rotating electrical machine MG such that the rotating electrical machine MG operates at the torque and the rotation speed indicated by the rotating electrical machine operating point. The rotating electrical machine control unit 35 also performs control in accordance with a battery state of charge detected by a battery state detection sensor, not shown in the drawings, to switch between a state in which the rotating electrical machine MG is caused to generate driving force using power supplied from the battery and a state in which the rotating electrical machine MG is caused to generate power using the driving force of the engine E. Note that the rotating electrical machine control unit 35 also controls the rotation speed of the pump motor 20 for driving the electric pump EP.

3-5. Shift Control Unit

During normal control, the shift control unit 36 determines a target shift speed of the transmission apparatus TM on the basis of the accelerator operation amount of the vehicle, the vehicle speed, and the shift position, and performs a shift by instructing engagement or disengagement of the respective frictional engagement elements in the transmission apparatus TM. To determine the target shift speed, the shift control unit 36 refers to a shift map (not shown) stored in the ROM or the like. In accordance with the determined target shift speed, the shift control unit 36 controls engagement or disengagement operations of the respective engagement elements C1, C2, C3, C4, B1, B2 on the basis of an operating table such as that shown in FIG. 4, which is stored in the ROM or the like, and thereby switches the shift speed of the transmission apparatus TM. In other words, as normal control, the shift control unit 36 sets the engagement elements selected in accordance with the determined target shift speed in an engaged state or a disengaged state by supplying a set working oil command pressure to the respective engagement elements via the oil pressure control apparatus PC in accordance with a set command pressure sequence, and thereby realizes the target shift speed. When the "D range" is selected as the shift position at this time, the shift control unit 36 determines the target shift speed from the first speed ($1^{st}$) to the eighth speed ($8^{th}$), whereas when the "R range" is selected, the shift control unit 36 determines the target shift speed from the first reverse speed (Rev1) and the second reverse speed (Rev2). Further, when the "P range" or the "N range" is selected, the shift control unit 36 sets the neutral speed (Ntl) as the target shift speed. When the neutral speed (Ntl) is set as the target shift speed, the shift control unit 36 performs control to disengage all of the engagement elements C1, C2, C3, C4, B1, B2. On the other hand, when alignment control, to be described below, is performed by the alignment control unit 32, the shift control performed by the shift control unit 36 is prohibited, and instead, shift control is performed by the alignment control unit 32.

3-6. Lockup Control Unit

The lockup control unit 37 is a function unit for determining a target engagement state of the lockup clutch LC, which serves as a frictional engagement element, on the basis of the accelerator operation amount of the vehicle, the vehicle speed, and the shift position, and controlling engagement or disengagement of the lockup clutch LC. To determine the target engagement state, the lockup control unit 37 refers to a lockup map (not shown) stored in the ROM or the like. In accordance with the determined target engagement state, the lockup control unit 37 controls the lockup clutch LC to an engaged state or a disengaged state by supplying a set working oil command pressure to the lockup clutch LC via the oil pressure control apparatus PC in accordance with a set command pressure sequence. When alignment control is performed by the alignment control unit 32, on the other hand, the alignment control unit 32 performs control to set the lockup clutch LC in the disengaged state by instructing the lockup control unit 37 to disengage the lockup clutch LC, as will be described below.

3-7. Parking Lock Control Unit

The parking lock control unit 38 is a function unit for switching the parking lock mechanism PR between the rotation fixed state and the fix released state. Normally, when a state command specifying the "P range" is input into the input information detection unit 33, the parking lock control unit 38 controls the parking lock mechanism PR to the rotation fixed state. When a state command specifying a range other than the "P range", i.e. the "N range", "D range" or "R range", is input into the input information detection unit 33, the parking lock control unit 38 controls the parking lock mechanism PR to the fix released state. When alignment control is performed by the alignment control unit 32, on the other hand, the parking lock control unit 38 performs control to set the parking lock mechanism PR in the fix released state in response to a command from the alignment control unit 32, as will be described below.

3-8. Alignment Control Unit

The alignment control unit 32 performs an alignment operation for aligning the rotary axis center positions of at least a part of the plurality of transmission rotary elements provided in the transmission apparatus TM in a case where a state shift command instructing a shift from the non-transmission state to the transmission state is input while the drive power sources 13 does not generate the driving force. The alignment control unit 32 is a featured function unit of this embodiment. In the alignment operation, the input shaft I serving as a drive input member is rotated by causing the drive power sources 13 to generate driving force and the intermediate shaft M serving as a shift input member is rotated via the torque converter 14 serving as a fluid coupling while maintaining the non-transmission state, i.e. before shifting to the transmission state by engaging at least one of the frictional engagement elements of the transmission apparatus TM. Hence, in this embodiment, the alignment operation corresponds to a "shift input rotation operation" according to the present invention. To realize this function, the alignment control unit 32 operates the respective function units of the control apparatus 31 in an integrated fashion.

Problems, actions, and effects relating to the alignment operation according to the present invention will now be described using an example shown in FIGS. 5A and 5B. Normally, an oil clearance for forming an oil film to allow smooth movement is provided between the transmission rotary elements of the transmission apparatus TM, or more specifically between gear couplings of the planetary gear apparatuses, bearing members such as bushes, and so on. However, when the transmission rotary elements are left in a non-rotating state, the members move downward under their own weight by an amount corresponding to the oil clearance. As a result, the respective rotary axis centers of the transmission rotary elements become eccentric, and moreover, the eccentric axial centers are not aligned. When these mutually eccentric transmission rotary elements are engaged by a frictional engagement element, the rotary axis centers are fixed in the eccentric state. When the transmission rotary elements are rotated in the fixed eccentric state, the oil clearance is not restored, and therefore the transmission rotary elements may become partially worn and noise may be generated from the transmission apparatus TM.

Figure 5A:
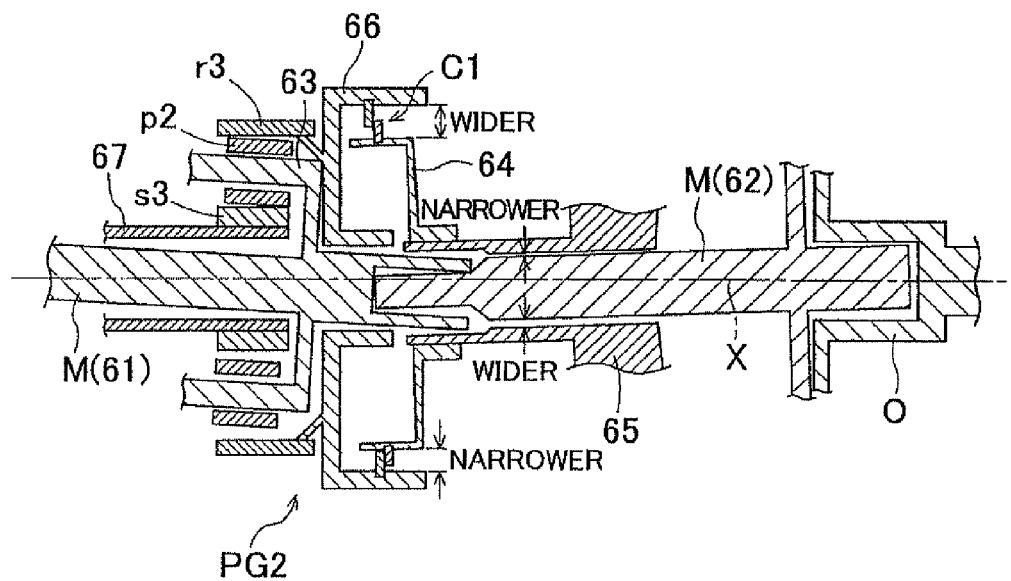
FIGS. 5A and 5B are views each illustrating actions and effects generated by alignment according to an embodiment of the present invention.

FIG. 5A shows in pattern form an example relating to the transmission apparatus TM shown in FIG. 3, in which the respective rotary axis centers of the transmission rotary elements on the periphery of the first clutch C1 have become eccentric. In this drawing, shaft members 61, 62 constituting the intermediate shaft M are spline-fitted to each other and play is provided in the spline fitting. Therefore, the shaft members 61, 62 sag downward relative to an axial center X under their own weight in the vicinity of a center portion. Further, axial centers of a pinion gear p2 and the carrier ca3 (63) of the second differential gear apparatus PG2 formed from a double pinion type planetary gear mechanism become eccentric under the weight of the pinion gear p2 and the carrier ca3 (63). Moreover, a bush-shaped bearing is formed between a cylindrical member 65 and the intermediate shaft M (62) and an oil clearance is provided therein, but as shown in FIG. 5A, an upper clearance is narrowed and a lower clearance is widened by the weight of these members. Due to the eccentricity of these transmission rotary members, the space in which the first clutch C1 is disposed becomes larger above the first clutch C1 and smaller below. Hence, when the first clutch C1 is engaged in this eccentric state, the eccentric state is fixed.

Figure 5B:
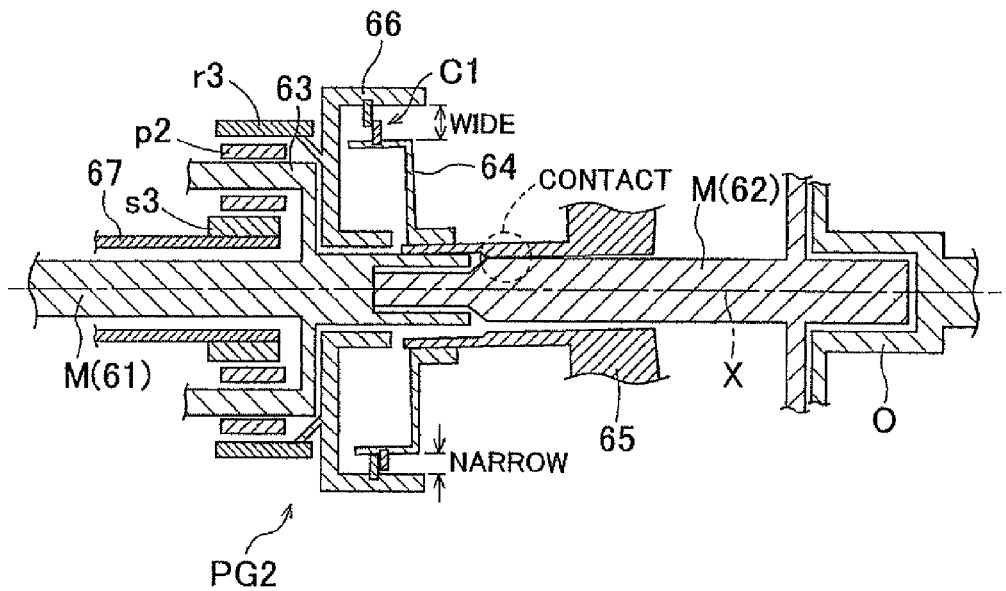

FIG. 5B shows a condition occurring when the shift input member (the intermediate shaft M) rotates, thereby rotating the transmission rotary elements, in a state where the first clutch C1 is engaged eccentrically. As shown in the drawing, when the respective transmission rotary elements are rotated, lubricating oil is supplied to the oil clearances apart from the eccentrically engaged first clutch C1, thereby correcting the bias of the oil clearances caused by the weight of the transmission rotary elements such that the eccentricity of the rotary axis centers is eliminated. However, since the first clutch C1 is eccentrically engaged, the clearance between the cylindrical member 65 and the intermediate shaft M (62) is not corrected, as shown in FIG. 5B. As a result, these relatively rotating members contact each other, leading to partial wear and noise generation.

By performing the alignment operation to rotate the shift input member (the intermediate shaft M) and thereby rotate the respective transmission rotary elements before engaging the first clutch C1 serving as a frictional engagement element, as in this embodiment, the lubricating oil can be supplied to the oil clearances, and therefore the bias of the oil clearances caused by the weight of the transmission rotary elements can be corrected. As a result, the eccentricity of the rotary axis centers and the eccentricity of the first clutch C1 can be eliminated. Note that the intermediate shaft M (62) also rotates in the clearance between the cylindrical member 65 and the intermediate shaft M (62), and therefore the lubricating oil is also supplied to this clearance such that the clearance is corrected. When the first clutch C1 is engaged after performing the alignment operation, the problems described above can be suppressed.

Further, according to this embodiment, the rotation of the input shaft I generated by the driving force of the rotating electrical machine MG is transmitted to the intermediate shaft M (62) via the torque converter 14. Therefore, a rotation speed difference exists between the input side and the output side of the torque converter 14 even in a state where the rotating electrical machine MG is caused to generate driving force when the frictional engagement element (the first clutch C1, for example) is engaged such that the transmission apparatus TM shifts to the transmission state. Hence, the rotation of the input shaft I is prevented from being transmitted directly to the intermediate shaft M (62), and as a result, variation in the driving force that is transmitted to the output shaft O via the transmission apparatus TM can be suppressed. Accordingly, the input shaft I can be rotated by the driving force of the rotating electrical machine MG even if the rotation of the output shaft O is stopped by a wheel brake or the like for stopping the vehicle wheel 18. There is therefore little need to perform control for suppressing driving force transmission to the output shaft O by controlling the driving force of the rotating electrical machine MG with a high degree of precision in synchronization with an engagement pressure of the frictional engagement element (the first clutch C1, for example). There is also little need to fix the output shaft O using the parking lock mechanism PR. Hence, the control executed during the alignment operation can be simplified, and a state in which the driving force of one or both of the rotating electrical machine MG and the engine E serving as the drive power sources 13 can be transmitted to the vehicle wheel 18 side can be established quickly.

3-8-1. Alignment Control Start Determination

Figure 6:
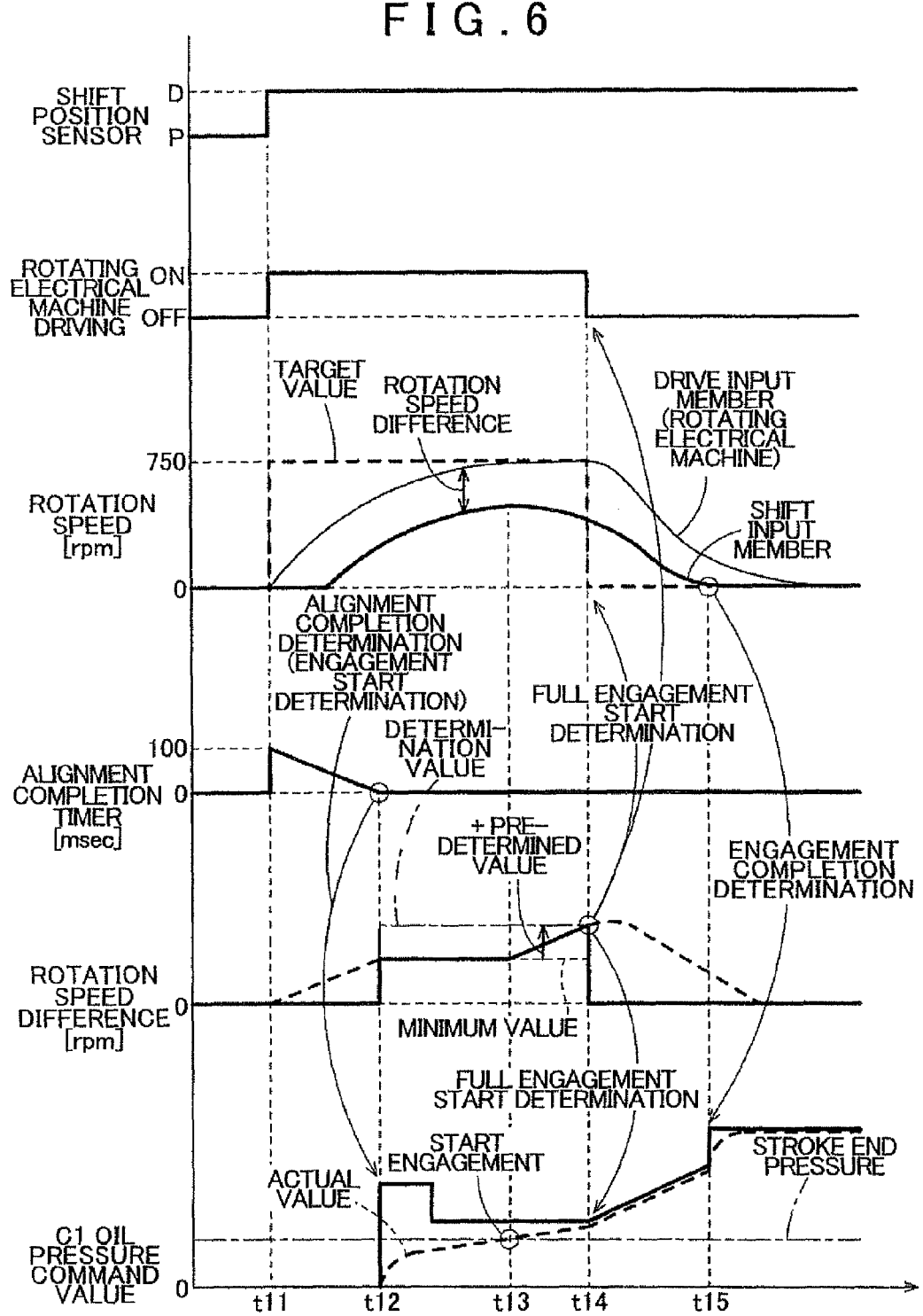
FIG. 6 is a timing chart showing processing performed by a control apparatus according to a first embodiment of the present invention.

The alignment control executed during the alignment operation of the alignment control unit 32 will be described in detail below. First, the alignment control unit 32 determines that an alignment control start condition is established when a state shift command to shift from the non-transmission state to the transmission state is input while the drive power sources 13 does not generate the driving force, and begins a series of alignment control processes relating to the alignment operation and engagement. In this embodiment, the drive power sources 13 are the engine E and the rotating electrical machine MG, and therefore a state in which neither of the drive power sources 13 generates driving force corresponds to the alignment control start condition. More specifically, the alignment control start condition is established when the engine E is stopped and the rotating electrical machine MG is neither rotating nor generating torque. The alignment control start condition is also determined to be established when a state shift command for shifting from the transmission state to the non-transmission state is detected in this state on the basis of a detection signal from the shift position sensor Se4. In this embodiment, the input information detection unit 33 detects a state shift command for shifting from the non-transmission state to the transmission state when the state command detected by the shift position sensor Se4 varies from the "P range" or the "N range" corresponding to the non-transmission state to the "D range" or the "R range" corresponding to the transmission state. In the following description of this embodiment, a case in which a state shift command for shifting from the "P range" corresponding to the non-transmission state to the "D range" corresponding to the transmission state is detected, as shown in FIG. 6 (time t11), will be used as an example.

3-8-2. Switching Respective Control Units To Alignment Control

When the alignment control unit 32 determines that the alignment control start condition described above is established, the control mode of the respective control units 34 to 38 is switched from a normal control mode to an alignment control mode. More specifically, the engine control unit 34 controls the engine E only in accordance with a command engine operating point from the alignment control unit 32. In this embodiment, the alignment operation is performed by rotationally driving the rotating electrical machine MG, and therefore the alignment control unit 32 issues a command to stop the engine E and prohibits startup and operation of the engine E. Further, the alignment control unit 32 issues a command to disengage the transmission clutch TC, whereupon the control apparatus 31 controls to disengage the transmission clutch TC. Here, the transmission clutch TC is controlled via the oil pressure control apparatus PC.

The rotating electrical machine control unit 35 controls the rotating electrical machine MG in accordance with a command rotating electrical machine operating point from the alignment control unit 32. In this embodiment, the alignment operation is performed by rotationally driving the rotating electrical machine MG, and therefore the alignment control unit 32 issues a command of the rotating electrical machine operating point obtained by setting the value of a target rotation speed, as will be described below, and then controls the rotating electrical machine MG via the rotating electrical machine control unit 35.

The alignment control unit 32 prohibits control of the transmission apparatus TM by the shift control unit 36 and switches to control of the transmission apparatus TM by the alignment control unit 32. The lockup control unit 37 controls the lockup clutch LC in accordance with a command target engagement state from the alignment control unit 32. In this embodiment, rotation and driving force transmission are performed via the torque converter 14, and therefore the alignment control unit 32 issues a command to the lockup control unit 37 to disengage the lockup clutch LC, whereupon engagement of the lockup clutch LC is prohibited.

The parking lock control unit 38 controls the state of the parking lock mechanism PR in accordance with a command from the alignment control unit 32. In this embodiment, the alignment control unit 32 issues a command to the parking lock control unit 38 to set the parking lock mechanism PR in the fix released state, whereby the parking lock mechanism PR is set in the fix released state. Hence, even if the shift position corresponds to the "P range" prior to input of the state shift command, the parking lock mechanism PR is set in the fix released state before the rotating electrical machine MG is caused to generate driving force.

Further, the alignment control unit 32 instructs the rotating electrical machine control unit 35 to rotationally drive the pump motor 20. Accordingly, lubricating oil is supplied to the interior of the transmission apparatus TM, thereby accelerating formation of an oil film as the rotating electrical machine MG rotates, and as a result, an alignment precision can be improved and an alignment time can be shortened. Furthermore, a responsiveness of the oil pressure supply for engaging the frictional engagement element (the first clutch C1, for example) of the transmission apparatus TM can be improved, leading to a reduction in the engagement time. The alignment control unit 32 also instructs the oil pressure control apparatus PC to increase the oil pressure of the lubricating oil supplied to the transmission apparatus TM beyond the oil pressure supplied during normal control. As a result, oil film formation in the transmission apparatus TM accompanying rotation of the rotating electrical machine MG can be accelerated, leading to an improvement in the alignment precision and a reduction in the alignment time. Hence, by controlling the oil pressure supply apparatus PC in accordance with the alignment operation, a further reduction in the alignment time can be achieved. As a result, a startup delay in the vehicle following detection of the state shift can be reduced, leading to an improvement in drivability.

3-8-3. Start of Driving of Drive Power Source

Once the respective function units of the control apparatus 31 have been switched to the alignment control mode, the alignment control unit 32 begins a sequence of alignment control processes relating to the alignment operation and engagement. First, the alignment control unit 32 starts rotationally driving the rotating electrical machine MG while keeping the transmission apparatus TM in the non-transmission state before shifting the transmission apparatus TM to the transmission state. In this example, as shown in FIG. 6 (time t11), rotational driving of the rotating electrical machine MG is begun when it is determined that the alignment control start condition is established. At this time, the alignment control unit 32 sets a target rotation speed of the rotating electrical machine MG and issues a command of the target rotation speed to the rotating electrical machine control unit 35. The rotating electrical machine control unit 35 begins rotationally driving the rotating electrical machine MG on the basis of the target rotation speed, and then varies the rotation speed of the rotating electrical machine MG from zero to the target rotation speed in a stepwise fashion. In the example shown in FIG. 6, an actual rotation speed responds to the stepwise variation in the target rotation speed at a delay. This response delay can be adjusted by setting a control gain of the rotating electrical machine control unit 35. The alignment control unit 32 can adjust the response delay by issuing a command of the control gain to the rotating electrical machine control unit 35.

3-8-4. Determination of Alignment Completion

In this embodiment, the alignment control unit 32 determines that the alignment operation for adjusting the position of at least a part of the rotary axis centers of the plurality of transmission rotary elements provided in the transmission apparatus TM is complete when a predetermined time has elapsed following the determination that the alignment control start condition is established. This predetermined time is set to correspond to a point at which alignment of the transmission rotary elements is completed, taking into account variation caused by various factors. In particular, a response delay in the intermediate shaft M relative to rotation variation in the input shaft I due to the interposition of the torque converter 14 must be taken into account, and therefore the predetermined time is set at a point where a sufficient rotation speed for achieving alignment of the intermediate shaft M is reached. Hence, even when alignment is performed via the torque converter 14, the alignment completion time can be determined with a high degree of precision. Note that a sufficient rotation speed for achieving alignment is approximately 200 rpm, for example. In the example shown in FIG. 6, when the alignment control start condition is established (time t11), the alignment control unit 32 sets an auto-decrement timer at a predetermined time (100 msec in the example shown in FIG. 6; to be referred to hereafter as a "timer time"), and when the timer time has elapsed such that the timer reaches zero (time t12), the alignment control unit 32 determines that the alignment operation is complete.

Further, when rotation of the transmission rotary elements in the transmission apparatus TM has been stopped for a long time, oil films are not formed sufficiently between the rotary elements in the transmission apparatus TM, and therefore the alignment operation must be performed for a longer period. When rotation of the transmission rotary elements has been stopped for a short time, on the other hand, the required time of the alignment operation decreases. Therefore, the aforesaid timer time may be set in accordance with the rotation stoppage time of the transmission rotary elements in the transmission apparatus TM. Alternatively, when the rotation stoppage time is shorter than a predetermined value, it may be determined that the alignment operation is not required, and normal control may be performed instead of alignment control. In so doing, an appropriate alignment period can be set in accordance with the required time of the alignment operation, which varies according to the rotation stoppage time. Hence, a delay occurring from issuance of the state shift command to the start of engagement of the frictional engagement element (here, the first clutch C1) can be shortened as required. As a result, a vehicle startup delay can be reduced, enabling an improvement in drivability. For similar reasons, the target rotation speed of the rotating electrical machine MG may be set in accordance with the rotation stoppage time.

Further, a torque conversion characteristic of the torque converter 14 varies according to a viscosity of the working oil charged into the torque converter 14, and therefore the aforementioned response delay in the intermediate shaft M also varies.

Furthermore, the viscosity of the lubricating oil supplied to the rotary elements of the transmission apparatus TM varies according to an oil temperature thereof, and therefore the time required for oil film formation and completion of the alignment operation also varies. Moreover, alignment control is often performed before the engine E is warm and before the oil temperature is stable. Therefore, the timer time may be varied in accordance with temperature information obtained by detecting the oil temperature or the like of the transmission apparatus TM. As the oil temperature decreases, the viscosity of the oil increases, and therefore the timer time is preferably increased. Thus, it is possible to respond to variation in the alignment completion time caused by variation in the oil temperature. For similar reasons, the target rotation speed of the rotating electrical machine MG may be set in accordance with this type of temperature information.

3-8-5. Start of Engagement Control

Once the alignment operation is determined to be complete, control for shifting the transmission apparatus TM from the non-transmission state to the transmission state is begun. Accordingly, an alignment completion determination condition, which is established when the aforementioned timer time elapses, corresponds to an engagement start determination condition. In this embodiment, when the engagement start determination condition is satisfied, the alignment control unit 32 performs control such that the engagement pressure of at least one of the frictional engagement elements (the first clutch C1, for example) of the transmission apparatus TM reaches a partial engagement pressure at which the frictional engagement element is partially engaged. After detecting an increase in the rotation speed difference between the input shaft I and the intermediate shaft M, the alignment control unit 32 performs control to increase the engagement pressure of the frictional engagement element beyond the partial engagement pressure such that the frictional engagement element is fully engaged. The engagement control executed on the frictional engagement element will be described below.

3-8-6. Determination of Frictional Engagement Element To Be Engaged

First, at least one of the frictional engagement elements of the transmission apparatus TM is determined as the frictional engagement element to be engaged. In this embodiment, as described above, a case in which a state shift command for shifting from the "P range" corresponding to the non-transmission state to the "D range" corresponding to the transmission state is used as an example, and therefore the shift control unit 36 sets the first shift speed ($1^{st}$) as the target shift speed and sets the first clutch C1 as the frictional engagement element to be engaged in accordance with the operating table shown in FIG. 4.

3-8-7. Start of Partial Engagement Pressure Control

When the start of engagement is determined on the basis of the engagement start determination condition, control for setting the first clutch C1 serving as the determined frictional engagement element at the partial engagement pressure is begun by supplying working oil to the first clutch C1 via the oil pressure control apparatus PC. In this embodiment, as shown in the example of FIG. 6, the partial engagement pressure is set at a pressure at which engagement of the first clutch C1 begins, or in other words a pressure that is larger than a stroke end pressure, i.e. a pressure at which the transmission torque capacity begins to be generated, by a predetermined pressure. The alignment control unit 32 then issues a command to the oil pressure control apparatus PC of the partial engagement pressure as a command pressure, whereupon working oil at the command pressure is supplied to the first clutch C1. Furthermore, in this example, as shown in FIG. 6, control for accelerating buildup of an actual pressure is performed by setting a higher command pressure than the partial engagement pressure momentarily immediately after the start of the partial engagement pressure control.

3-8-8. Determination of Partial Engagement Completion

When an increase in the rotation speed difference between the input shaft I and the intermediate shaft M is detected after the start time of the partial engagement pressure control, the engagement pressure of the first clutch C1 is increased beyond the partial engagement pressure to shift the first clutch C1 to a fully engaged state. As shown in the example of FIG. 6, when the actual pressure of the first clutch C1 reaches the stroke end pressure (time t13) following the start of the engagement operation relating to the first clutch C1 and then increases gradually to the partial engagement pressure, the transmission torque capacity of the first clutch C1 gradually increases. As a result, the rotation speed of the intermediate shaft M varies in a synchronous direction with the rotation speed of the output shaft O. When the vehicle wheel 18 is stationary, the output shaft O is stopped, and therefore the rotation speed of the intermediate shaft M gradually decreases (time t13 onward). Meanwhile, the torque converter 14 is interposed between the intermediate shaft M and the input shaft I, and therefore, although the differential rotation of the torque converter 14 increases, substantially no variation occurs in the rotation speed of the input shaft I, which is driven to rotate by the rotating electrical machine MG Hence, as shown in FIG. 6 (time t13 onward), the rotation speed difference between the intermediate shaft M and the input shaft I increases.

In this embodiment, as shown in FIG. 6, detection and monitoring of the rotation speed difference between the input shaft I and the intermediate shaft M is started from a start time (time t12) of the partial engagement pressure control. When the rotation speed difference reaches a predetermined determination value (time t14), it is determined that the engagement pressure has reached the partial engagement pressure, and therefore the partial engagement pressure control is determined to be complete.

In this example, as shown in FIG. 6, processing is performed to detect a minimum value of the rotation speed difference detected from the start of monitoring of the rotation speed difference to the present time, and a value obtained by adding a predetermined value to the minimum value of the rotation speed difference is set as the aforementioned predetermined determination value. More specifically, to calculate the minimum value of the rotation speed difference, the rotation speed difference at the start of monitoring is set as an initial minimum value of the rotation speed difference, and thereafter, a previously updated minimum value of the rotation speed difference is compared with a current rotation speed difference, the smaller value being set as the minimum value of the rotation speed difference. Thus, even when the rotation speed difference at the point where the engagement pressure reaches the stroke end pressure varies, an amount of variation in the rotation speed difference can be monitored using the varying rotation speed difference as a reference, and therefore completion of the partial engagement pressure control can be determined more robustly with respect to variation. In particular, when rotary driving force is transmitted via the torque converter 14, as in this embodiment, the differential rotation of the torque converter 14 is likely to vary due to variation in the viscosity of the working oil in the torque converter 14, friction between the respective rotary members, and so on, and therefore the method of setting this determination value increases in importance.

3-8-9. Stopping Generation of Driving Force By Drive Power Source

When an increase in the rotation speed difference between the input shaft I and the intermediate shaft M via the torque converter 14 is detected such that the partial engagement pressure control is determined to be complete, generation of the driving force by the rotating electrical machine MG is halted. In this embodiment, an identical condition to the condition for determining completion of the partial engagement pressure control is set as a rotating electrical machine driving stopping condition for stopping driving of the rotating electrical machine MG. Therefore, as shown in FIG. 6, the alignment control unit 32 halts driving of the rotating electrical machine MG when the partial engagement pressure control is determined to be complete (time t14). At this time, the alignment control unit 32 sets the target rotation speed of the rotating electrical machine MG at zero and informs the rotating electrical machine control unit 35 thereof. On the basis of the target rotation speed, the rotating electrical machine control unit 35 varies the rotation speed of the rotating electrical machine MG to zero in a stepwise fashion. In the example shown in FIG. 6, the actual rotation speed of the rotating electrical machine MG varies at a delay relative to the target rotation speed varied in a stepwise fashion. As described above, the alignment control unit 32 can adjust this response delay by issuing a command of the control gain to the rotating electrical machine control unit 35. Further, different control gains may be used when the rotation speed of the rotating electrical machine MG is increased and decreased.

3-8-10. Start of Full Engagement Control And Determination of Completion Thereof When an increase in the rotation speed difference between the input shaft I and the intermediate shaft M is detected such that the partial engagement pressure control is determined to be complete, control is performed to increase the engagement pressure of the first clutch C1 beyond the partial engagement pressure such that the first clutch C1 is shifted to the fully engaged state. In this embodiment, the working oil command pressure is increased in stages from the partial engagement pressure to a full engagement pressure from the point (time t14) at which the partial engagement pressure control is determined to be complete, and when the full engagement pressure is reached, engagement control relating to the alignment control is terminated.

In this example, as shown in FIG. 6, the command pressure is increased from the partial engagement pressure at a predetermined rate of change from the point (time t14) at which the partial engagement pressure control is determined to be complete. In proportion with the oil pressure increase, the transmission torque capacity increases and a rotation speed difference between the input and output members of the first clutch C1 decreases. When the rotation speed difference reaches zero, it is determined that the fully engaged state is established, and the command pressure is increased to the full engagement pressure in a stepwise fashion. In this embodiment, as described above, the driving force of the rotating electrical machine MG is reduced and driving force is transmitted between the input shaft I and the intermediate shaft M via the torque converter 14 at the start of the full engagement control, and therefore the rotation speed of the intermediate shaft M gradually aligns with the rotation speed of the output shaft O as the engagement pressure of the first clutch C1 increases. In this example, the vehicle is stationary, and therefore the rotation speed of the intermediate shaft M gradually decreases toward zero. Hence, in this embodiment, the fully engaged state is determined to be established when the rotation speed of the intermediate shaft M falls to or below a predetermined determination value. In the example shown in FIG. 6, the predetermined determination value is set at zero, and therefore the fully engaged state is determined to be established when the rotation speed of the intermediate shaft M reaches zero (time t15). The command pressure is then increased to the full engagement pressure in a stepwise fashion, whereupon the engagement control relating to the alignment control is terminated.

3-8-11. Returning Respective Function Units To Normal Control

When the alignment operation and engagement are complete, processing is performed to return the respective function units that have been switched to the alignment control mode, as described above, to the normal control mode. The series of alignment control processes is then terminated.

3-8-12. Processing Procedure of Alignment Control Unit

Figure 7:
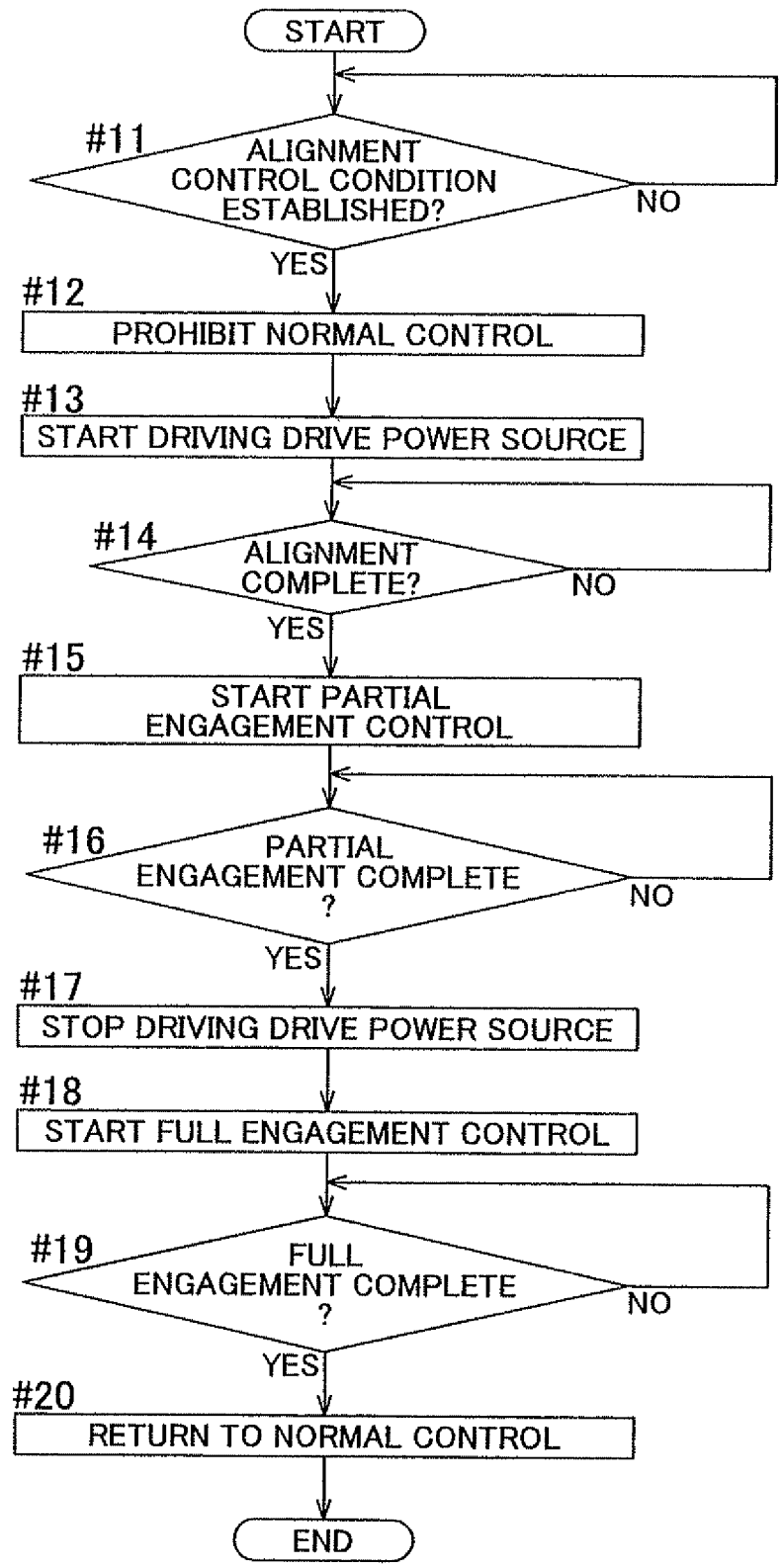
FIG. 7 is a flowchart showing the processing performed by the control apparatus according to the first embodiment of the present invention.

Next, the series of alignment control processes relating to the alignment operation and engagement according to this embodiment will be described with reference to a flowchart shown in FIG. 7. First, the alignment control unit 32 performs processing to determine whether or not the alignment control start condition described above is established (step #11). When the alignment control start condition is established (step #11: Yes), processing is performed to switch the respective control units to the alignment control mode as described above (step #12). Next, processing is performed to start generation of the driving force by the rotating electrical machine MG (step #13). Next, a determination is made as to whether or not the alignment completion determination condition (the engagement start determination condition) is established, and therefore that alignment is complete, as described above (step #14). When the alignment completion determination condition is established (step #14: Yes), processing is performed to start the partial engagement control as described above (step #15). Next, a determination is made on the basis of the increase in the rotation speed difference between the drive input member and the shift input member as to whether or not the partial engagement pressure control completion condition is established, and therefore that the partial engagement pressure control is complete, as described above (step #16). When the completion condition is established (step #16: Yes), processing is performed to halt generation of the driving force by the rotating electrical machine MG as described above (step #17). Next, processing is performed to start the full engagement control as described above (step #18). Next, a determination is made as to whether or not the full engagement completion condition is established, and therefore that full engagement is complete, as described above (step #19). When the completion condition is established (step #19: Yes), processing is performed to return the respective control units to normal control as described above (step #20). The series of alignment control processes is then terminated.

4. Second Embodiment

Next, a second embodiment of the present invention will be described. In the first embodiment described above, the alignment control unit 32 determines whether or not alignment is complete (whether or not to start engagement) on the basis of the elapsed time (the timer time) following the start of the alignment control, but in this embodiment, the alignment control unit 32 determines whether or not alignment is complete on the basis of the rotation speed of the intermediate shaft M. Further, in the first embodiment, the alignment control unit 32 determines whether or not to stop generation of the driving force by the drive power source 13 and start full engagement control on the basis of the increase in the rotation speed difference between the input shaft I and the intermediate shaft M, but in this embodiment, the alignment control unit 32 determines whether or not to stop generation of the driving force by the drive power source 13 using a point in time at which the rotation speed of the drive power source 13 reaches a determination value as a reference, and determines whether or not to start full engagement control in accordance with an elapsed time following the engagement start determination. All other constitutions are similar to the first embodiment. Therefore, differences with the first embodiment will be described below.

4-1. Alignment Control Unit

As described above, the alignment control unit 32 differs partially between the first embodiment and this embodiment. Therefore, the alignment control unit 32 will be described below, focusing on the content of the differences.

4-1-1. Start of Driving of Drive Power Source

Figure 8:
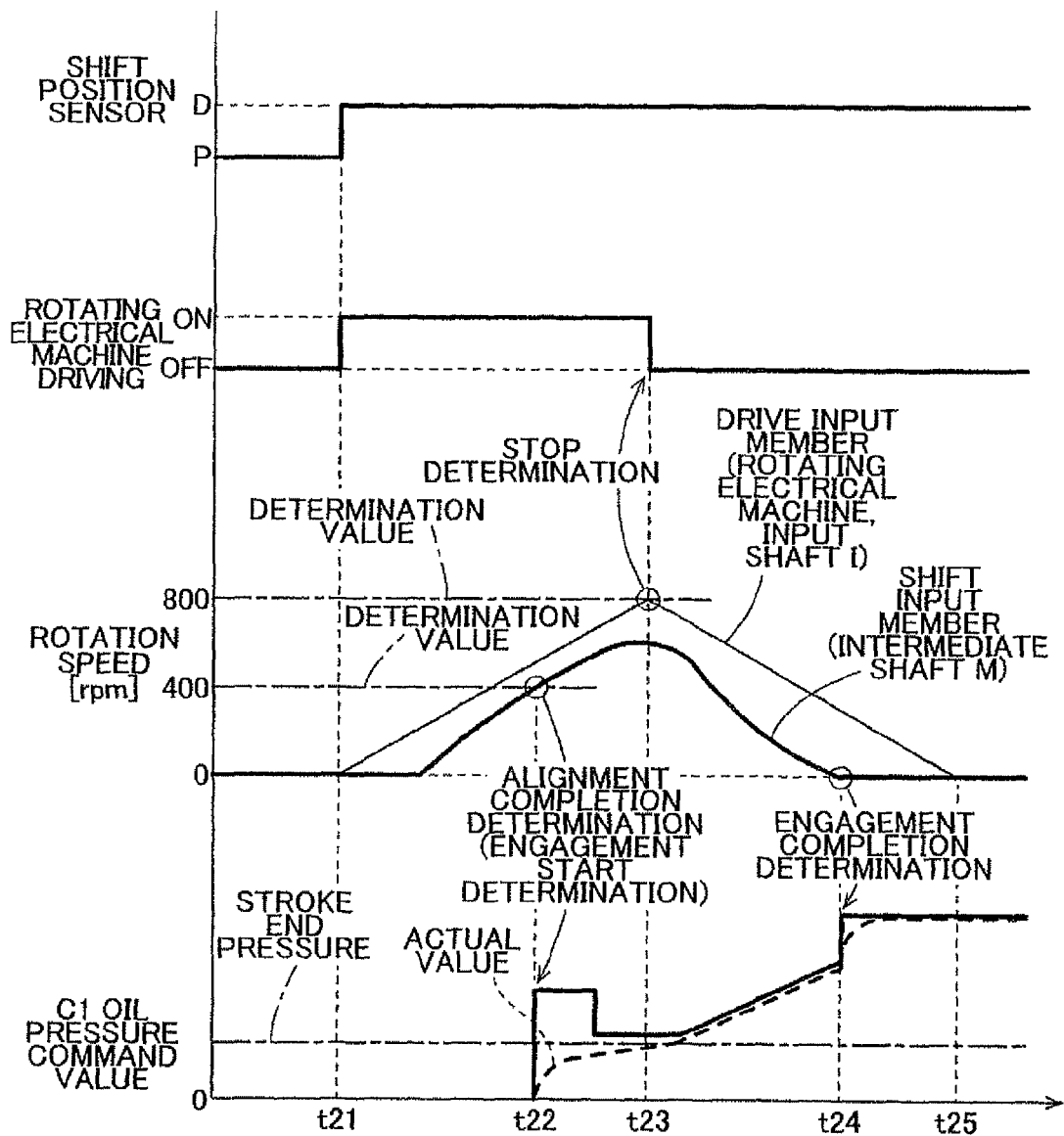
FIG. 8 is a timing chart showing processing performed by a control apparatus according to a second embodiment of the present invention.

The alignment control unit 32 according to this embodiment determines the start of the alignment control and switches the control units to the alignment control mode in a similar manner to the first embodiment. Next, having determined that the alignment control start condition is established, the alignment control unit 32 begins rotationally driving the drive power source 13. In this embodiment, as shown in FIG. 8, the alignment control unit 32 increases the target rotation speed at a predetermined rate of change from the alignment control start determination (time t21). In this example, the alignment control unit 32 sets the rate of change at 1100 [rpm/sec], but the rate of change may be modified in accordance with each condition. In this example, a case in which the rotating electrical machine MG is used as the drive power source 13 will be described. Hence, by setting the rate of change of the target rotation speed at a fixed value, the actual rotation speed of the rotating electrical machine MG can follow the target rotation speed at a comparatively small delay, and therefore the alignment control unit 32 can set the actual rotation speed of the rotating electrical machine MG according to a plan. Hence, the alignment control unit 32 can perform the alignment operation using the rotation of the rotating electrical machine MG in a more planned manner, leading to an improvement in the alignment precision.

4-1-2. Determination of Alignment Completion

In this embodiment, the alignment control unit 32 determines that the alignment operation for adjusting the position of at least a part of the rotary axis centers of the plurality of transmission rotary elements provided in the transmission apparatus TM is complete on the basis of the rotation speed of the intermediate shaft M following the alignment control start determination. In this example, as shown in FIG. 8, the alignment control unit 32 determines that the alignment operation is complete when the rotation speed of the intermediate shaft M reaches an alignment completion determination speed. As described above, in the present invention in particular, the response delay in the intermediate shaft M relative to rotation variation in the input shaft I due to the interposition of the torque converter 14 must be taken into account, and this response delay may vary according to the viscosity of the working oil in the torque converter 14 and friction between rotary members. Hence, in this embodiment, the alignment control unit 32 determines completion of the alignment operation on the basis of the actual rotation speed of the intermediate shaft M, and therefore the alignment control unit 32 can determine the point at which alignment is completed with a high degree of precision even when alignment is performed via the torque converter 14, as in the present invention. In the example shown in FIG. 8, the alignment control unit 32 sets the completion determination speed at 400 [rpm], but the completion determination speed may be modified in accordance with various conditions.

Further, as described above, when rotation of the transmission rotary elements in the transmission apparatus TM has been stopped for a long time, oil films are not formed sufficiently between the rotary elements in the transmission apparatus TM, and therefore the alignment operation must be performed at a higher rotation speed. On the other hand, when the rotation stoppage time of the transmission rotary elements is short, the required rotation speed of the alignment operation decreases. Therefore, the alignment completion determination speed that is compared to the rotation speed of the intermediate shaft M may be set in accordance with the rotation stoppage time of the transmission rotary elements of the transmission apparatus TM. Alternatively, when the rotation stoppage time is shorter than a predetermined value, it may be determined that the alignment operation is not required, and normal control may be performed instead of alignment control. In so doing, an appropriate alignment period can be set in accordance with the required rotation speed of the alignment operation, which varies according to the rotation stoppage time. For similar reasons, the alignment control unit 32 may set the rate of change of the target rotation speed of the drive power source 13, described above, and a drive completion determination speed used to determine stoppage of the drive power source 13, to be described below, in accordance with the rotation stoppage time. Thus, a delay time from issuance of the state shift command to the start of engagement of the first clutch C1 can be shortened as required. As a result, a startup delay in the vehicle can be reduced, leading to an improvement in drivability.

Further, the viscosity of the lubricating oil supplied to the respective rotary elements of the transmission apparatus TM varies according to the oil temperature thereof, and therefore the rotation speed of the intermediate shaft M and the alignment period required to form an oil film and complete the alignment operation also vary. Moreover, alignment control is often performed before the engine E is warmed up and before the oil temperature is stable. Therefore, the alignment completion determination speed may be varied in accordance with temperature information obtained by detecting the oil temperature or the like of the transmission apparatus TM. As the oil temperature decreases, the viscosity of the oil increases, and therefore the alignment completion determination speed is preferably increased. For similar reasons, the alignment control unit 32 may set the rate of change of the target rotation speed of the rotating electrical machine MG, described above, and the drive completion determination speed used to determine stoppage of the rotating electrical machine MG, to be described below, in accordance with this type of temperature information.

4-1-3. Stopping Generation of Driving Force By Drive Power Source

In this embodiment, as shown in FIG. 8, the alignment control unit 32 determines to stop generation of the driving force by the rotating electrical machine MG when the target rotation speed of the rotating electrical machine MG, which is increased at the predetermined rate of change as described above, reaches the drive completion determination speed (time t23). The alignment control unit 32 then reduces the target rotation speed at a predetermined rate of change from this stoppage determination point (time t23). In this example, the drive completion determination speed is set at 800 [rpm] and the rate of change is set at −1100 [rpm/sec], but these values may be modified in accordance with various conditions, as noted above. Further, the alignment control unit 32 may vary the rate of change depending on whether the rotation speed of the rotating electrical machine MG is increased or decreased. More preferably, the alignment control unit 32 may set a point following the elapse of a predetermined time from the point at which the target rotation speed of the rotating electrical machine MG reaches a predetermined determination value as the stoppage determination point such that during the predetermined time, the target rotation speed is maintained at the drive completion determination speed.

4-1-4. Start of Full Engagement Control

Having determined that the alignment operation is complete, the alignment control unit 32 begins control for shifting the transmission apparatus TM from the non-transmission state to the transmission state. Accordingly, the alignment completion determination corresponds to an engagement start determination. In this embodiment, the method of determining the start of full engagement control differs from that of the first embodiment, but all other constitutions are similar to their counterparts in the first embodiment. In this embodiment, as shown in FIG. 8, the alignment control unit 32 terminates the partial engagement pressure control automatically and begins the full engagement control when a predetermined time elapses from the engagement start determination point. Hence, the alignment control unit 32 does not have to wait until a rotation speed difference is detected between the input shaft I and the intermediate shaft M before starting the full engagement control, as in the first embodiment described above, and as a result, the time required to complete engagement can be shortened. The reason for this, as described above, is that the alignment control unit 32 increases and decreases the target rotation speed of the rotating electrical machine MG at the predetermined rate of change and can therefore set the rotation speed of the rotating electrical machine MG with stability and according to a plan, and as a result, the engagement operation can also be set according to a plan.

4-1-5. Returning Respective Function Units To Normal Control

When the alignment operation and engagement are complete, the alignment control unit 32 performs processing to return the respective function units switched to the alignment control mode, as described above, to the normal control mode. The series of alignment control processes is then terminated.

4-1-6. Processing Procedure of Alignment Control Unit

Next, the series of alignment control processes relating to the alignment operation and engagement according to this embodiment will be described with reference to a flowchart shown in FIG. 9. First, the alignment control unit 32 performs similar processing to the first embodiment to determine whether or not the alignment control start condition is established (step #21). When the alignment control start condition is established (step #21: Yes), the alignment control unit 32 performs similar processing to the first embodiment to switch the respective control units to the alignment control mode (step #22). Next, the alignment control unit 32 performs processing to start generation of the driving force by the rotating electrical machine MG as described above (step #23). Although not shown in the flowchart of FIG. 9, the alignment control unit 32 automatically performs processing to halt generation of the driving force by the rotating electrical machine MG following an increase in the target rotation speed, as described above. Next, the alignment control unit 32 determines whether or not the alignment completion determination condition (the engagement start determination condition) is established, and therefore that alignment is complete, on the basis of the rotation speed of the intermediate shaft M, as described above (step #24). When it is determined that the alignment completion determination condition is established (step #24: Yes), the alignment control unit 32 performs processing to start the partial engagement pressure control, and following the elapse of the predetermined time, the alignment control unit 32 performs processing to start the engagement control, i.e. control for starting the full engagement control, as described above (step #25). Next, similarly to the first embodiment, the alignment control unit 32 determines whether or not the condition for determining completion of the fully engaged state is established, and therefore that full engagement is complete (step #26). When the completion determination condition is established (step #26: Yes), the alignment control unit 32 performs processing to return the respective control units to normal control, as described above (step #27). The series of alignment control processes is then terminated.

[Other Embodiments]

(1) In the embodiments described above, the vehicle driving apparatus 2 for a hybrid vehicle including the engine E and the rotating electrical machine MG as the drive power sources 13 was used as an example, and a case in which the alignment operation is performed by rotationally driving the rotating electrical machine MG was described as an example. However, the embodiments of the present invention are not limited thereto. Specifically, a constitution in which the alignment operation is performed by starting and rotationally driving the engine E instead of, or in addition to, the rotating electrical machine MG in the vehicle driving apparatus 2 for a hybrid vehicle including the engine E and the rotating electrical machine MG as the drive power sources 13 also serves as a preferred embodiment of the present invention. Further, a constitution in which the alignment operation is performed by starting and rotationally driving the engine E in a vehicle that does not include the rotating electrical machine MG as the drive power source 13 also serves as a preferred embodiment of the present invention. In all cases, the control apparatus 31 controls the engagement state of the transmission clutch TC before or after startup of the engine E such that the driving force of the engine E is transmitted to the transmission apparatus TM via a fluid coupling such as the torque converter 14. In this case, the control apparatus 31 may be constituted to stop rotationally driving the engine E when an alignment completion determination condition is satisfied, similarly to the rotating electrical machine MG of the above embodiments. In another preferred embodiment, the control apparatus 31 shifts to the normal control mode without halting rotational driving of the engine E after the alignment completion determination condition is satisfied.

(2) In the above embodiments, a case in which the vehicle driving apparatus 2 includes a single rotating electrical machine MG was described as an example, but the embodiments of the present invention are not limited thereto, and in another preferred embodiment of the present invention, the vehicle driving apparatus 2 includes a plurality of rotating electrical machines MG as the drive power sources 11 In this case, the alignment operation can be performed by rotationally driving all or a part of the plurality of rotating electrical machines MG In another preferred embodiment of the present invention, the transmission clutch TC is not provided in the vehicle driving apparatus 2 for a hybrid vehicle including the engine E and the rotating electrical machine MG as the drive power sources 13 according to the above embodiments.

(3) In the above embodiments, the vehicle driving apparatus 2 for a hybrid vehicle including the engine E and the rotating electrical machine MG as the drive power sources 13 was described as an example. However, the embodiments of the present invention are not limited thereto. Specifically, in another preferred embodiment of the present invention, the vehicle driving apparatus 2 includes either the engine E or the rotating electrical machine MG alone as the drive power source 13. When the vehicle driving apparatus 2 includes only the engine E, the vehicle driving apparatus 2 may be applied to an idling stop vehicle such that the control apparatus 31 stops the engine E even when the vehicle is stationary for a short time. In this case, the various parameters set or determined in accordance with the rotation stoppage time of the transmission rotary elements in the transmission apparatus TM in the above embodiments, namely the timer time and alignment completion determination speed used to determine completion of the alignment operation, the target rotation speed, drive completion determination speed, and target rotation speed rate of change of the drive power source 13, the determination as to whether or not to execute the alignment operation, and so on, may be set or determined in accordance with a rotation stoppage time of idling stop-related transmission rotary elements provided in the transmission apparatus TM to stop the engine E. In an idling stop vehicle, the engine E is stopped every time the vehicle stops, for example while waiting at stoplights or the like, and therefore the delay time from issuance of the state shift command to the start of engagement of the first clutch C1 can be reduced greatly, enabling a reduction in the startup delay of the vehicle and an improvement in drivability.

(4) In the above embodiments, a case in which the state commands for setting the transmission apparatus TM in the transmission state correspond to the "D range" and the "R range" was described as an example. However, the embodiments of the present invention are not limited thereto, and in another preferred embodiment of the present invention, other state commands, such as "second range", "low range", and so on may be selected as the selection positions of the shift lever SL serving as a switch operation unit.

(5) In the above embodiments, a case in which the switch operation unit for receiving an operation to switch the state of the transmission apparatus TM is the shift lever SL was described as an example. However, the embodiments of the present invention are not limited thereto, and in other preferred embodiments of the present invention, various input reception apparatuses for receiving operation input from a driver, such as a dial or a button, are used as the switch operation unit instead of the shift lever SL.

(6) In the above embodiments, a case in which the state command is detected on the basis of input information from the shift position sensor Se4 was described as an example. However, the embodiments of the present invention are not limited thereto, and in another preferred embodiment of the present invention, the control apparatus 31 generates a state command not based on the input information from the shift position sensor Se4 or in opposition to the input information from the shift position sensor Se4. In this case, a constitution in which the control apparatus 31 executes the alignment operation on the basis of a self-generated state shift command for shifting from the non-transmission state to the transmission state serves as a further preferred embodiment of the present invention.

(7) In the above embodiments, a case in which the state command is detected on the basis of input information from the shift position sensor Se4 was described as an example. However, the embodiments of the present invention are not limited thereto. For example, even in a case where the "D range" or the like has been selected such that the transmission apparatus TM is in the transmission state, the drive power source 13 of a hybrid vehicle, an idling stop vehicle, or the like may be stopped and the oil pressure supplied to the frictional engagement elements of the transmission apparatus TM from the oil pressure control apparatus PC may be reduced such that the transmission apparatus TM enters the non-transmission state. Alternatively, in certain cases, the transmission apparatus TM may be controlled to the non-transmission state in accordance with a command from the control apparatus 31 even when a state command for setting the transmission apparatus TM in the transmission state, for example the "D range", is detected on the basis of input information from the shift position sensor Se4. In cases such as this, i.e. when the state command indicates the transmission state but the transmission apparatus TM is in the non-transmission state, the control apparatus 31 controls the transmission apparatus TM back to the transmission state, and a case in which a state shift command for shifting from the transmission state to the transmission state is input may be included in the present invention.

(8) A case in which the control apparatus 31 according to the above embodiments determines completion of the alignment operation according to the elapsed time following the start of the alignment operation in the first embodiment and on the basis of the rotation speed of the shift input member in the second embodiment was described above. However, the embodiments of the present invention are not limited thereto, and completion of the alignment operation may be determined on the basis of the rotation speed of the shift input member in the first embodiment and on the basis of the elapsed time following the start of the alignment operation in the second embodiment.

(9) In the second embodiment, a case in which the control apparatus 31 performs control to maintain the partial engagement pressure following the start of the engagement control and then performs the full engagement control was described as an example. However, the embodiments of the present invention are not limited thereto, and in another preferred embodiment of the present invention, the full engagement control is performed directly in the second embodiment without performing control for setting the partial engagement pressure following the start of the engagement control. In this case also, a high command pressure may be set momentarily following the start of the engagement control to accelerate buildup of the actual pressure.

(10) A case in which the control apparatus 31 according to the above embodiments performs the alignment operation by increasing and decreasing the target rotation speed of the drive power source 13 in a stepwise fashion in the first embodiment and varying the target rotation speed of the drive power source 13 at the predetermined rate of change in the second embodiment was described as an example. However, the embodiments of the present invention are not limited thereto, and the control apparatus 31 according to the above embodiments may perform the alignment operation by varying the target rotation speed of the drive power source 13 at the predetermined rate of change in the first embodiment and increasing and decreasing the target rotation speed of the drive power source 13 in a stepwise fashion in the second embodiment. Furthermore, the target rotation speed may be increased or decreased using a combination of stepwise variation and variation at the predetermined rate of change, or in accordance with a desired waveform.

(11) In the second embodiment, a case in which the rotating electrical machine MG is used as the drive power source 13 and the rotation speed of the rotating electrical machine MG is increased and decreased at the predetermined rate of change was described as an example. However, the embodiments of the present invention are not limited thereto, and in the second embodiment, the engine E may be used as the drive power source 13 such that the rotation speed of the engine E is increased and decreased at the predetermined rate of change. Further, the rotation speed of the engine E may be increased and decreased at the predetermined rate of change using a predetermined rotation speed corresponding to a rotation speed following engine startup or prior to engine stoppage as a reference.

(12) In the above embodiments, a case in which the control apparatus 31 sets the point at which the driving force of the drive power source 13 is stopped after the point at which completion of the alignment operation is determined was described as an example. However, the embodiments of the present invention are not limited thereto, and in another preferred embodiment of the present invention, the control apparatus 31 according to the above embodiments may set the point at which the driving force of the drive power source 13 is stopped to be identical to the point at which completion of the alignment operation is determined, using the point at which completion of the alignment operation is determined as a reference (for example, following the elapse of a predetermined time from the point at which completion of the alignment operation is determined), and so on. In so doing, the period during which driving force is generated by the drive power source 13 can be aligned with the period of the alignment operation, thereby reducing the generation period to a required minimum.

(13) In the above embodiments, a case in which the transmission apparatus TM is a stepped automatic transmission apparatus having a first shift speed to an eighth shift speed was described as an example. However, the embodiments of the present invention are not limited thereto, and as long as the transmission apparatus TM is constituted to include a plurality of transmission rotary elements and at least one frictional engagement element such that when the frictional engagement element is set in an engaged state, a transmission state in which an input side rotation is transmitted to an output side is established, and when the frictional engagement element is set in a disengaged state, a non-transmission state in which the input side rotation is not transmitted to the output side is established, any type of transmission apparatus may be employed. For example, in other preferred embodiments of the present invention, a stepped automatic transmission apparatus having an arbitrary number of shift speeds, a double clutch type transmission, an automatic control type manual transmission, and so on are used as the transmission apparatus TM.

The present invention may be used favorably as a vehicle driving apparatus that includes a drive power source, a fluid coupling, a transmission apparatus, and a control apparatus for controlling at least the drive power source and the transmission apparatus, in which a rotation of a drive input member driven by the drive power source is transmitted to a shift input member via the fluid coupling and a rotation of the shift input member is shifted by the transmission apparatus and then transmitted to an output member.

What is claimed is:
1. A vehicle driving apparatus, comprising:
a drive power source;
a fluid coupling;
a transmission apparatus; and
a control apparatus for controlling at least the drive power source and the transmission apparatus, wherein
a rotation of a drive input member driven by the drive power source is transmitted to a shift input member via the fluid coupling and a rotation of the shift input mem- ber is shifted by the transmission apparatus and then transmitted to an output member, the transmission apparatus includes a plurality of transmission rotary elements and at least one frictional engagement element such that when the frictional engagement element is set in an engaged state, a transmission state in which the rotation of the shift input member is transmitted to the output member is established, and when the frictional engagement element is set in a disengaged state, a non-transmission state in which the rotation of the shift input member is not transmitted to the output member is established, and when a state shift command for shifting from the non-transmission state to the transmission state is input into the control apparatus in a state where the drive power source does not generate a driving force, the control apparatus performs a shift input rotation operation before engaging the frictional engagement element and shifting to the transmission state by causing the drive power source to generate the driving force in order to rotate the drive input member and rotate the shift input member via the fluid coupling while maintaining the non-transmission state.

2. The vehicle driving apparatus according to claim 1, further comprising a lock mechanism that can be switched between a rotation fixed state in which a rotation of the output member is mechanically fixed and a fix released state in which the fix is released, wherein when the lock mechanism is in the rotation fixed state during the shift input rotation operation, the control apparatus switches the lock mechanism to the fix released state before causing the drive power source to generate the driving force.

3. The vehicle driving apparatus according to claim 1, wherein the control apparatus includes a drive control unit for controlling a driving state of the drive power source, and the drive control unit stops generation of the driving force by the drive power source when an increase in a rotation speed difference between the drive input member and the shift input member via the fluid coupling is detected after shifting of the frictional engagement element to the engaged state is started.

4. The vehicle driving apparatus according to claim 1, wherein the control apparatus includes an engagement control unit for controlling an engagement state of the frictional engagement element, and after the state shift command for shifting from the non-transmission state to the transmission state has been input and a predetermined engagement start condition has been satisfied, the engagement control unit performs control such that an engagement pressure of the frictional engagement element becomes a partial engagement pressure at which the frictional engagement element enters a partially engaged state, and after an increase is detected in a rotation speed difference between the drive input member and the shift input member, the engagement control unit increases the engagement pressure of the frictional engagement element beyond the partial engagement pressure such that the frictional engagement element enters a fully engaged state.

5. The vehicle driving apparatus according to claim 4, wherein the engagement start condition is defined by a time period based on an input timing of the state shift command for shifting from the non-transmission state to the transmission state, or a rotation speed of the shift input member.

6. The vehicle driving apparatus according to claim 1, wherein the state shift command is input into the control apparatus on the basis of an operation of a switching operation unit for receiving at least an operation to switch the transmission apparatus between the transmission state and the non-transmission state.

\* \* \* \* \*